(12) United States Patent
Meager

(10) Patent No.: US 9,457,647 B2
(45) Date of Patent: Oct. 4, 2016

(54) LOW GRAVITY ALL-SURFACE VEHICLE

(71) Applicant: PAHA DESIGNS, LLC, Denver, CO (US)

(72) Inventor: Benjamin Meager, Bozeman, MT (US)

(73) Assignee: PAHA DESIGNS, LLC, Denver, CO (US)

( * ) Notice: Subject to any disclaimer, the term of this patent is extended or adjusted under 35 U.S.C. 154(b) by 131 days.

(21) Appl. No.: 14/674,764

(22) Filed: Mar. 31, 2015

(65) Prior Publication Data

US 2015/0274000 A1  Oct. 1, 2015

Related U.S. Application Data

(60) Provisional application No. 61/973,075, filed on Mar. 31, 2014.

(51) Int. Cl.
| | | |
|---|---|---|
| *B60K 7/00* | (2006.01) | |
| *B62D 61/06* | (2006.01) | |
| *B60F 3/00* | (2006.01) | |
| *B62D 61/02* | (2006.01) | |
| *B60K 17/356* | (2006.01) | |
| *A63H 17/00* | (2006.01) | |

(52) U.S. Cl.
CPC ............. *B60K 7/00* (2013.01); *B60F 3/0007* (2013.01); *B60F 3/0038* (2013.01); *B60K 7/0007* (2013.01); *B60K 17/356* (2013.01); *B62D 61/02* (2013.01); *B62D 61/06* (2013.01); *A63H 17/004* (2013.01); *B60K 2007/0053* (2013.01); *B60K 2007/0061* (2013.01); *B60Y 2200/24* (2013.01); *B60Y 2200/42* (2013.01); *B60Y 2200/48* (2013.01)

(58) Field of Classification Search
CPC ....... B62M 7/12; A63H 17/004; B60K 1/00; B60K 1/02; B60K 1/04; B60K 17/043; B60K 7/00; B60K 7/0007; B62D 61/06; B62D 61/08; B60L 2220/44; B62B 5/004; B62B 5/0043
USPC ........................................ 180/211, 21, 65.51
See application file for complete search history.

(56) References Cited

U.S. PATENT DOCUMENTS 1,357,571 A * 11/1920 Knepper ................... B60K 7/00
 180/10
1,905,345 A *  4/1933 Dandini ................... B63B 1/047
 180/10

(Continued)

FOREIGN PATENT DOCUMENTS

WO     WO 2010/077300     7/2010

OTHER PUBLICATIONS

Wikipedia entry for "servomotor"; https://en.wikipedia.org/wiki/Servomotor; Jan. 21, 2016.*

(Continued)

*Primary Examiner* — Keith Frisby
(74) *Attorney, Agent, or Firm* — Sheridan Ross P.C.

(57) ABSTRACT

Vehicles are disclosed which have a lower center of gravity than existing all-terrain, amphibious, and unmanned ground vehicles due to the location of propulsion units and other vehicle components inside the wheels of the vehicle. The vehicles can climb over large obstacles yet are also able to corner at high speeds. The vehicles can be configured for direct manual operation or operation by remote control, and can also be configured for a wide variety of missions.

19 Claims, 24 Drawing Sheets

(56) References Cited

U.S. PATENT DOCUMENTS

| | | | |
|---|---|---|---|
| 1,915,886 A | | 6/1933 | Gutierrez |
| 3,016,967 A | | 1/1962 | Rehfeld |
| 3,661,212 A | * | 5/1972 | Johnson .................. A01B 3/50 |
| | | | 172/258 |
| 3,905,323 A | * | 9/1975 | Kacere ...................... B60F 3/00 |
| | | | 114/39.23 |
| 4,102,542 A | | 7/1978 | Pirre, Jr. et al. |
| 4,501,569 A | * | 2/1985 | Clark, Jr. ............. A63H 33/005 |
| | | | 180/21 |
| 4,726,800 A | * | 2/1988 | Kobayashi ........... A63H 33/005 |
| | | | 446/458 |
| 6,328,123 B1 | * | 12/2001 | Niemann ............. B60K 7/0007 |
| | | | 180/65.51 |
| 2002/0011368 A1 | * | 1/2002 | Berg ........................ B60K 7/00 |
| | | | 180/218 |
| 2003/0010551 A1 | | 1/2003 | Shirazawa |
| 2003/0213630 A1 | | 11/2003 | Pyntikov et al. |
| 2004/0092206 A1 | * | 5/2004 | Lynders ............... A63H 17/262 |
| | | | 446/427 |
| 2012/0302390 A1 | | 11/2012 | Lemire-Elmore et al. |
| 2013/0049498 A1 | | 2/2013 | Boughtwood |
| 2013/0153311 A1 | | 6/2013 | Huntzinger |

OTHER PUBLICATIONS

International Search Report and Written Opinion for International (PCT) Patent Application No. PCT/US15/23557, mailed Jul. 13, 2015 12 pages.

* cited by examiner

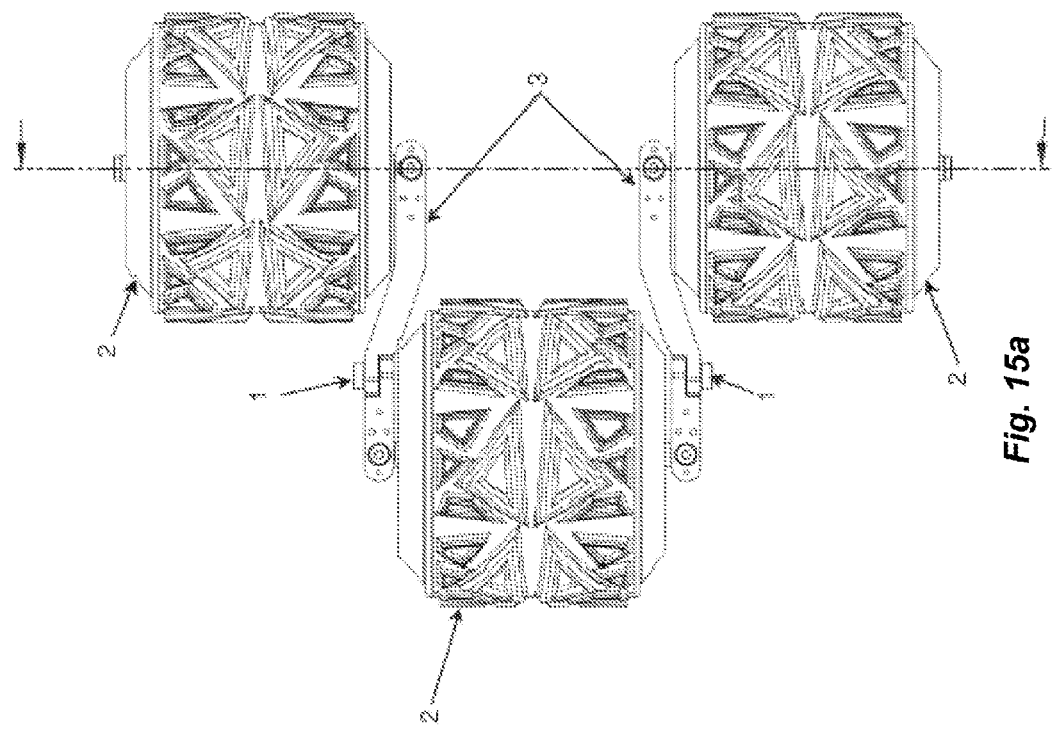
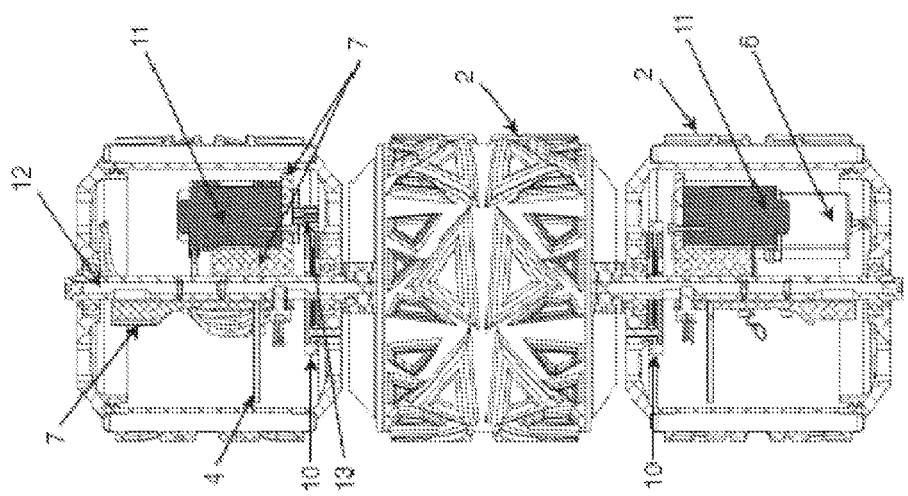

LOW GRAVITY ALL-SURFACE VEHICLE

CROSS-REFERENCE TO RELATED APPLICATIONS

The present application claims the benefit of U.S. Provisional Patent Application No. 61/973,075 filed on Mar. 31, 2014, which is incorporated herein by reference in its entirety.

FIELD

The present disclosure relates generally to the field of ground and amphibious vehicles. More specifically, it relates to lowering the center of gravity of ground and amphibious vehicles, regardless of whether they are remotely operated, computer controlled or direct driven vehicles.

BACKGROUND

Known surface vehicles are useful and valuable to this day, but are limited in their use due to their inability to corner and travel at high speeds. As an example, a High Mobility Multipurpose Wheeled Vehicle commonly known as the Humvee, or a high clearance demonstration vehicle such as the Monster Truck, can climb over very large objects. However, both vehicles have the undesired tendency to flip over when cornering too quickly or when climbing an object that is too steep. This undesired effect is primarily caused by having the majority of each vehicle's weight, and therefore its center of gravity, well above the wheels. In contrast, an advanced race car, such as a Formula One race car, has its center of gravity close to the ground. As a result, it has the ability to corner at very high speeds. The body of a Formula One race car, however, is also very close to the ground. This prevents it from climbing over objects of even the smallest size, making it a ground vehicle that is ideal for high speed cornering, but not acceptable for climbing over objects as required by all-terrain vehicles.

The solution for combining both of these benefits is utilized in vehicles disclosed herein to great effect. Embodiments of the vehicles disclosed herein are capable of both cornering at high speeds and climbing large objects. The vehicles have this capability due to a dramatically lower center of gravity relative to traditional vehicles and in some cases, because they utilize very large wheels.

Prior art vehicles have been created with a low center of gravity and a single large wheel, but the use of only one wheel in these designs has created yet another dramatic limitation. When attempting to accelerate at high speeds or climb large objects, these single-wheel vehicles are susceptible to the motorized portion of their interior spinning off-axis, thus preventing the vehicle from operating at all. With a vehicle that has only one wheel, the axis or axle of the vehicle is not fixed on a plane. Gravity and weight alone keep the power unit from free-spinning inside the wheel. Due to this limitation, over-accelerating the vehicle can allow the insides of the vehicle to spin off-axis, such that the wheel and vehicle remain stationary while the insides of the vehicle spin. Embodiments of vehicles disclosed herein solve this problem by using more than one wheel to keep the axis and axles in-plane, thus allowing for rapid acceleration, high speed cornering and the ability to climb large objects.

SUMMARY

Embodiments of vehicles disclosed herein are designed for moving and cornering at high speeds as well as being able to climb large objects. Such vehicles also have the unique ability to prevent high centering, a problem common to most vehicles, including all-terrain vehicles. In some embodiments, the vehicles can move across the top of water like a boat (amphibious vehicle). As disclosed herein, these benefits are accomplished by moving the majority of the vehicle weight (engines, motors, batteries, cooling systems, electronics, etc.) into the inside of the wheel itself and below the level of the axle. By using more than one wheel, where the wheels do not all share the same axis, embodiments of the vehicles disclosed herein are capable of more rapid acceleration than was achieved by prior art vehicles using motors placed inside a single wheel.

Though embodiments of the vehicles disclosed herein are very difficult to flip over due to their low center of gravity and high clearance, the vehicles do not have a top or a bottom, or a front or a back. This makes the vehicles capable of flipping over and continuing on their path. It also allows for increased maneuverability, due to the fact that the controls can be reversed. By simply adjusting the individual speeds of the motors or engines in each wheel (like a tank), embodiments of the vehicles disclosed herein are capable of steering without the need for additional external moving parts. This allows the vehicles disclosed herein to be robust.

The present disclosure has benefits for all types of vehicles. Embodiments of the vehicles disclosed herein are suitable for a wide variety of applications, including but not limited to: full size tanks for military action, robots capable of climbing stairs at high speeds, amphibious remotely operated vehicles (ROVs) capable of high speed water and land operations, remote control toys, unmanned vehicles that are capable of carrying large supplies and weapons to a battlefield, and even off-road race vehicles.

In accordance with at least one embodiment, a vehicle is provided that generally comprises:
- a frame comprising a plurality of axles having a plurality of axes;
- a plurality of wheels, each wheel rotatably connected to an axle and defining an inner volume; and
- a plurality of frame mounts, each frame mount positioned within the inner volume of a wheel and connected to an axle, each frame mount further having a portion extending below the axis of the axle, which portion supports a propulsion unit drivingly coupled to the wheel, an energy source, and a control unit;
- wherein the center of gravity of the vehicle is below the plurality of axes.

In some embodiments, each portion of the frame of the vehicle between two axles includes a pivot.

In some embodiments, the propulsion unit is at least one of a motor and an engine, the energy source is at least one of a battery and a fuel tank, and the control unit is at least one of an electronic speed control and a throttle.

In some embodiments, the vehicle also comprises a receiver configured to receive signals from a transmitter and to send corresponding signals to at least one of the control units.

In some embodiments, the vehicle is configured to change direction by at least one of varying the speed of a propulsion unit and changing the length of a linear actuator.

In some embodiments, the vehicle further comprises at least one of a waterproof material configured to prevent water from entering the inner volume of at least one of the plurality of wheels and features on the outer circumference of at least one of the plurality of wheels that enhance the propulsion of the vehicle on water.

In some embodiments, the vehicle further comprises a seat located within the inner volume of at least one of the plurality of wheels and configured to support a person below the axle to which the wheel is connected.

In accordance with at least another embodiment, a reconfigurable vehicle system is provided that generally comprises:
- a plurality of self-contained wheels each rotatably connected to an axle, each wheel comprising:
  - a substantially cylindrical inner volume;
  - a mount connected to the axle and positioned within the inner volume, each mount having a portion extending below the axle that supports a propulsion unit drivingly coupled to the wheel, an energy source, and a control unit;
- wherein the axles of the plurality of self-contained wheels are detachably engageable to a frame.

In some embodiments, the reconfigurable vehicle system further comprises a semi-permeable membrane configured to prevent liquid from entering the inner volume.

In some embodiments, each mount of the reconfigurable vehicle system mount further supports a receiver adapted to receive signals from a transmitter and to send corresponding signals to the control unit.

In some embodiments, the reconfigurable vehicle system further comprises at least one of a frame adapted to maintain the plurality of self-contained wheels in substantial linear alignment and a frame adapted to maintain two of the plurality of self-contained in wheels in substantial axial alignment.

In some embodiments, the center of gravity of each self-contained wheel of the reconfigurable vehicle system is lower than the axle of each self-contained wheel.

In some embodiments, each mount of the reconfigurable vehicle system is selectively rotatable around the axle to which it is connected.

In some embodiments, the reconfigurable vehicle system further comprises a servo configured to partially rotate each mount around the axle to which it is connected.

In accordance with at least another embodiment, a vehicle system is provided that generally comprises:
- a frame comprising a plurality of structural members and at least one joint, each structural member connecting to an axle that is rotatably connected to a wheel;
- a propulsion device for driving the wheel;
- an energy source; and
- a control unit;
- wherein the propulsion device, energy source, and control unit are suspended from the axle and positioned inside the wheel.

In some embodiments, the frame of the vehicle system holds two wheels along a single first axis and a third wheel along a second axis substantially parallel to the first axis. Further, in some embodiments the first axis is separated from the second axis by less than the average outermost diameter of the wheels.

In some embodiments, the frame of the vehicle system holds at least two wheels in linear alignment.

In some embodiments, the vehicle system further comprises a linear actuator configured to move two axles relative to each other.

In some embodiments, the vehicle system further comprises a seat suspended from at least one axle and adapted to support a person below the axle to which the seat is attached.

BRIEF DESCRIPTION OF THE DRAWINGS

The present disclosure is described in conjunction with the appended figures, which are not necessarily drawn to scale:

FIGS. 15a-b depict a section view of the embodiment of FIG. 1;

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Various changes may be made in the function and arrangement of elements without departing from the spirit and scope of the appended claims.

Embodiments of vehicles disclosed herein typically (but not necessarily) comprise four primary features: multiple wheels with centrally located axles, the majority of the vehicle's weight located below the level of the axles and inside the wheels, a simple frame to join the axles, and joints that allow the axles to pivot independently from each other.

Figure 1:
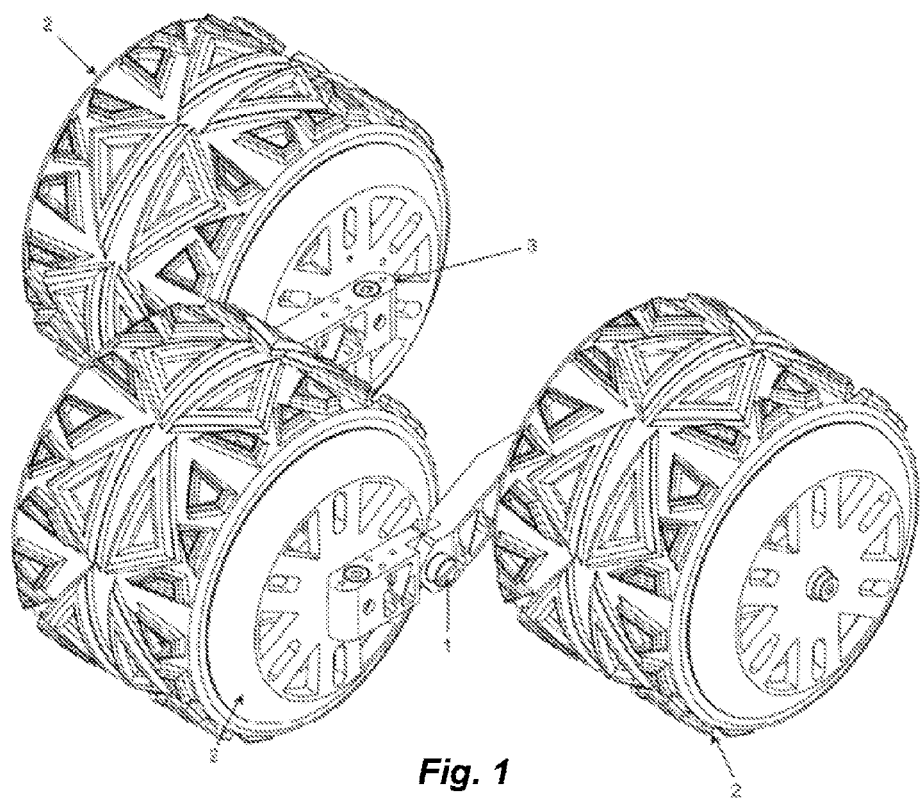
FIG. 1 is an isometric view of an embodiment of the present disclosure.

FIG. 1 shows an isometric view of the outside of a three-wheel embodiment of the present disclosure. The wheels 2 in FIG. 1 are considerably larger than the frame 3 of the vehicle. Wheels 2 are shown to be identical in size, but in embodiments wheels 2 do not all have the same size. Most prior art vehicles require a large frame to house the motor, batteries, suspension, steering and everything else needed to operate the vehicle. This embodiment houses these vital components inside the wheels 2. In this three-wheel variation, the frame 3 has a pivot 1 that allows portions of the frame to move up and down independently. In this case, the pivot 1 allows the two outer wheels 2 to move up and down without influencing the center wheel 2 or each other.

Figure 2:
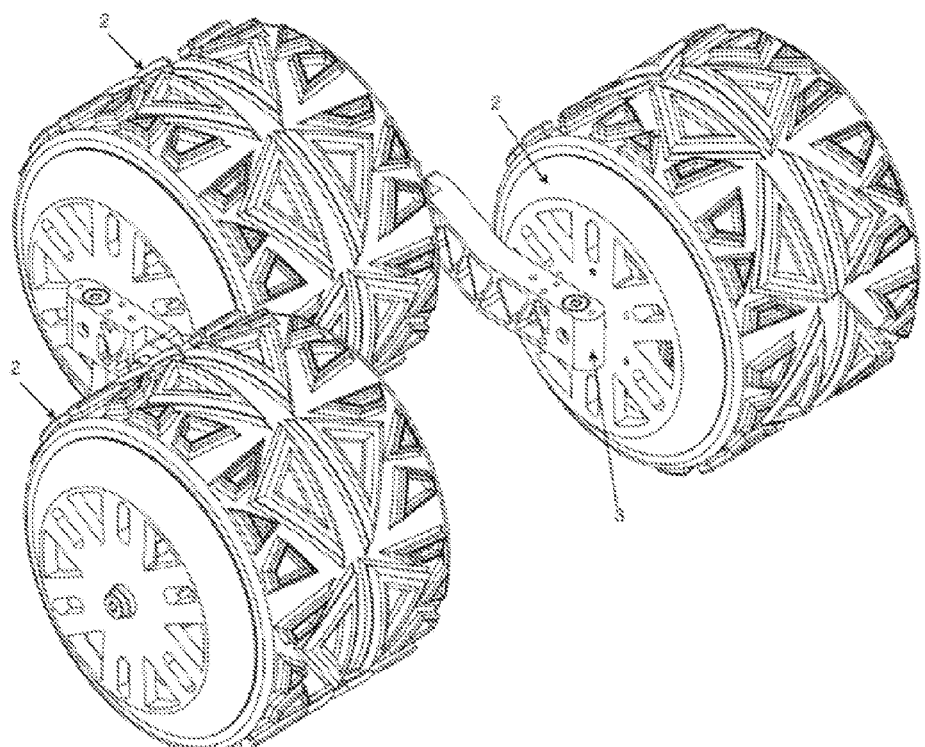
FIG. 2 is another isometric view of the embodiment of FIG. 1.

FIG. 2 is another isometric view depicting the other side of the vehicle of FIG. 1. As with most embodiments of the present disclosure, this vehicle does not have a front or a back, allowing the vehicle to run at full speed in both directions by simply reversing the electronic controls on the transmitter. The wheels 2 are connected at their axles by a simple frame 3 with two pivots or hinges 1.

Figure 3:
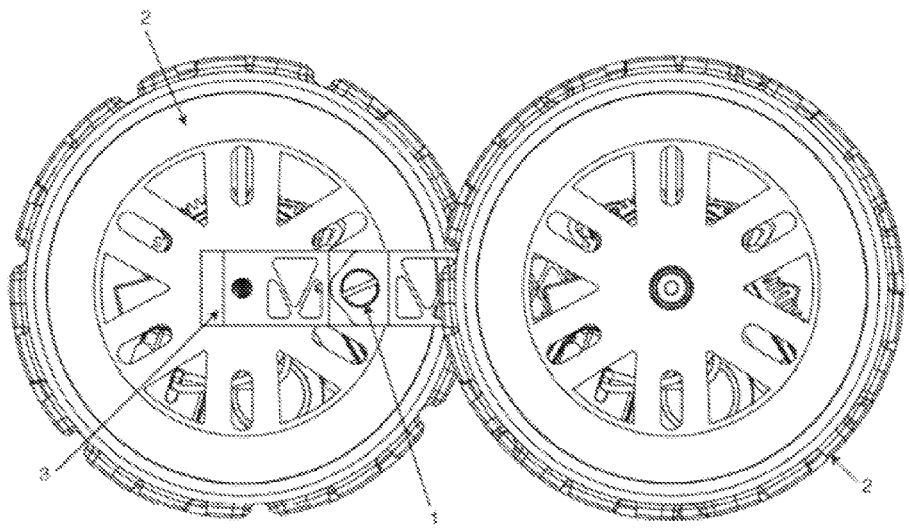
FIG. 3 is a side view of the embodiment of FIG. 1.

FIG. 3 is a side view of the outside of the same three-wheel embodiment of FIG. 1, and makes one of the main advantages of the depicted embodiment readily apparent. Specifically, this embodiment is incredibly difficult to high-center (i.e. where the ground contacts the frame undesirably). Because vehicle components that, in prior art vehicles, are typically attached to the vehicle frame outside of the wheels have been relocated inside the wheels 2, embodiments of the present disclosure utilize only a minimal frame 3 interconnect the wheels 2. With such a minimal frame 3, high-centering is very unlikely. Indeed, in the embodiment of FIG. 3, the side and center wheels 2 are close enough in distance that it is almost impossible for any type of terrain to contact the frame 3.

In embodiments, the frame 3 can be any object or collection of objects capable of supporting two or more wheels 2. For example, the frame 3 can comprise a stick, a shipping container, a PODS® container (PODS® is a registered trademark of PODS Enterprises, Inc.), or any other object or collection of objects without departing from the scope of the present disclosure. The wheels 2 may be directly attached to the frame 3, or may be attached to the frame 3 through modified frame mounts 7. As another alternative, the wheels 2 may be attached to an adapter, which is in turn attached to the frame 3.

Figure 4:
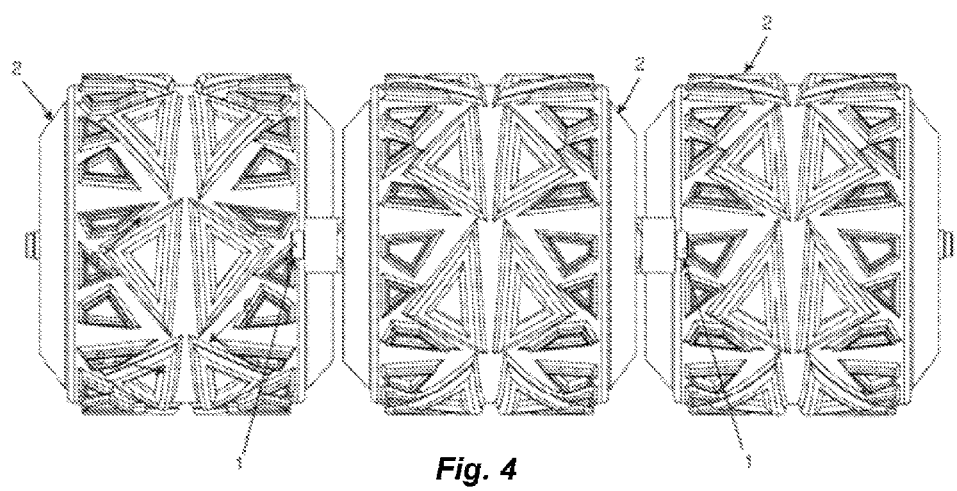
FIG. 4 is a back view of the embodiment of FIG. 1.

As shown in the front view in FIG. 4, this three-wheel embodiment has incredible traction due to the majority of the vehicle's width being covered in tire tread. This embodiment therefore has considerably more surface traction than other prior art vehicles of its same size.

Figure 5:
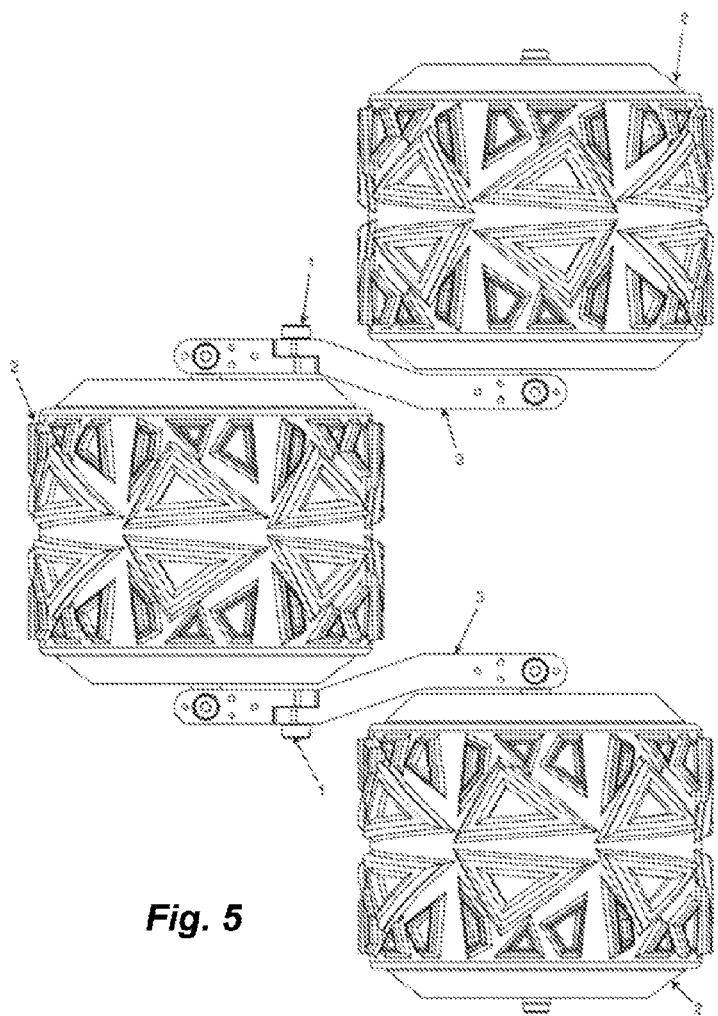
FIG. 5 is a top view of the embodiment of FIG. 1.
Figure 6:
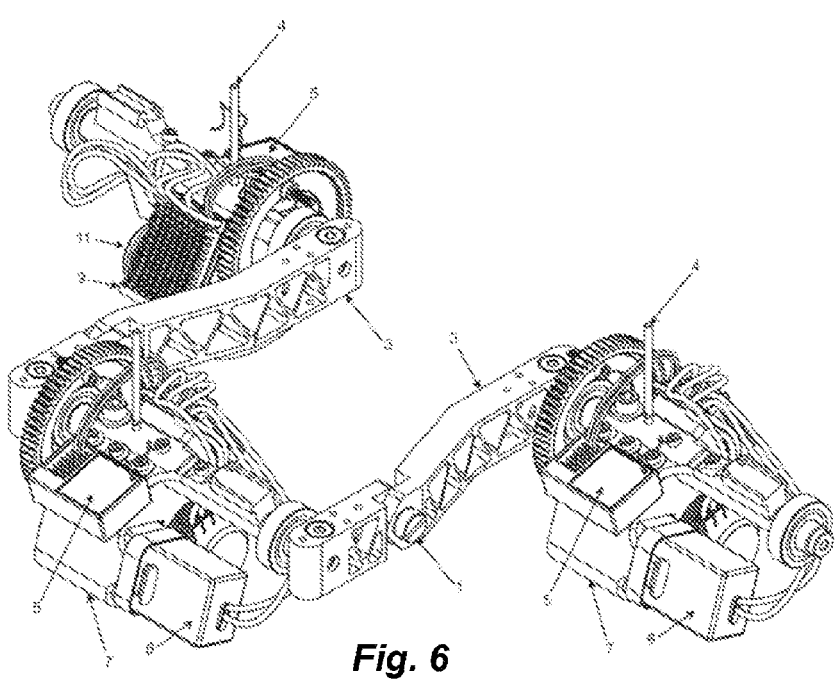
FIG. 6 is an isometric view of the embodiment of FIG. 1 with the wheels removed.
Figure 7:
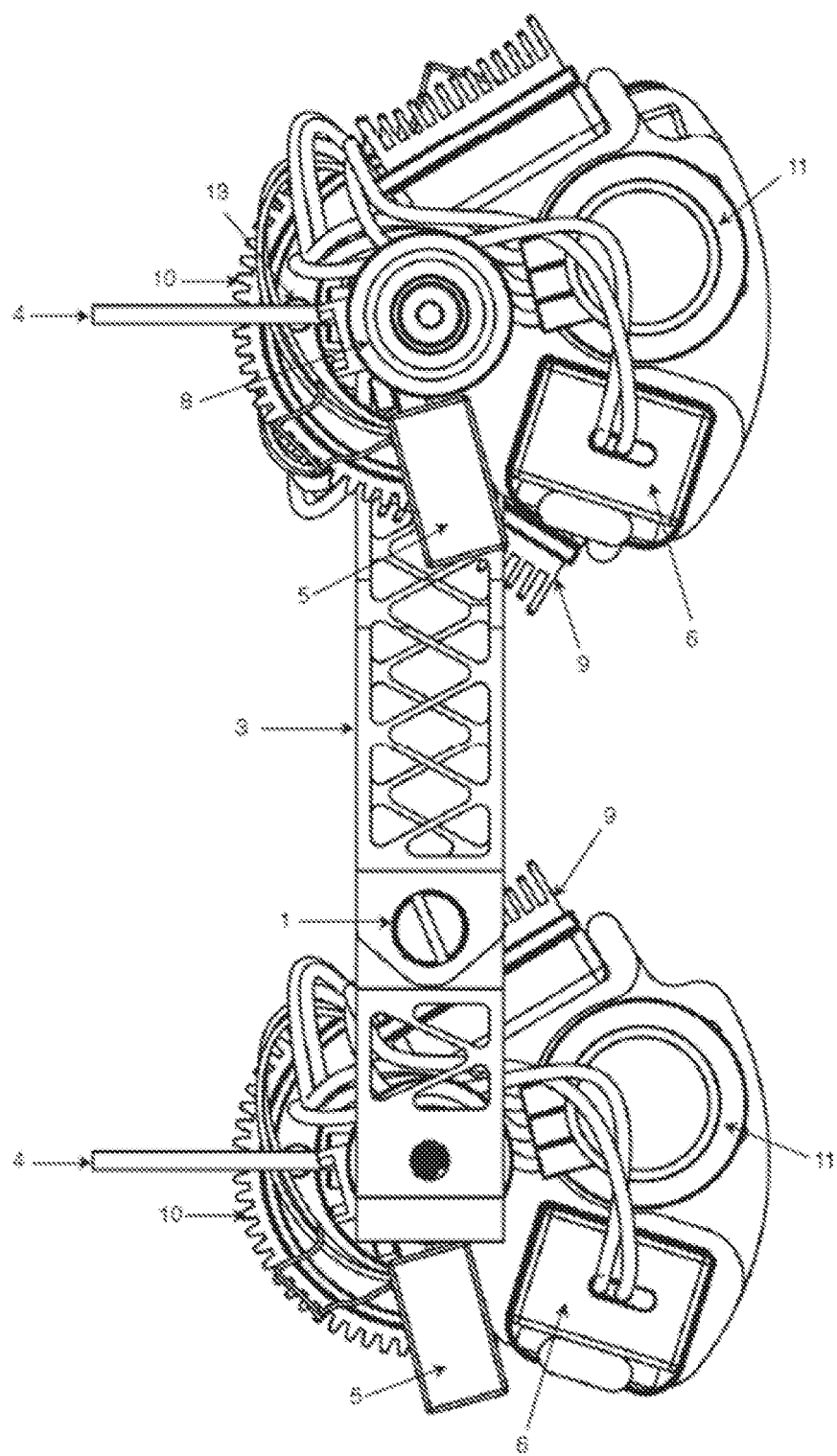
FIG. 7 is an end view of the embodiment of FIG. 1 with the wheels removed.
Figure 8:
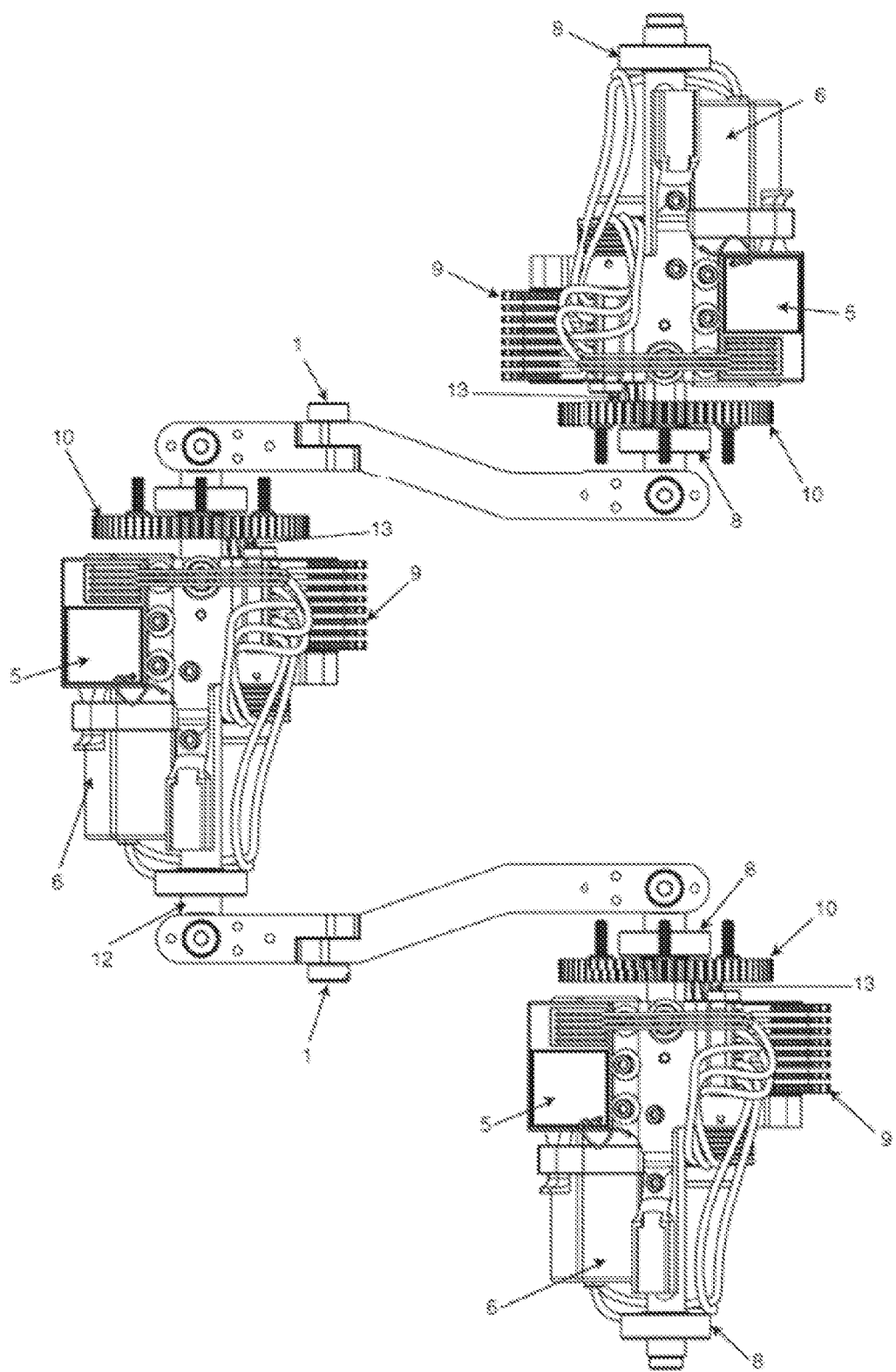
FIG. 8 is a top view of the embodiment of FIG. 1 with the wheels removed.
Figure 9:
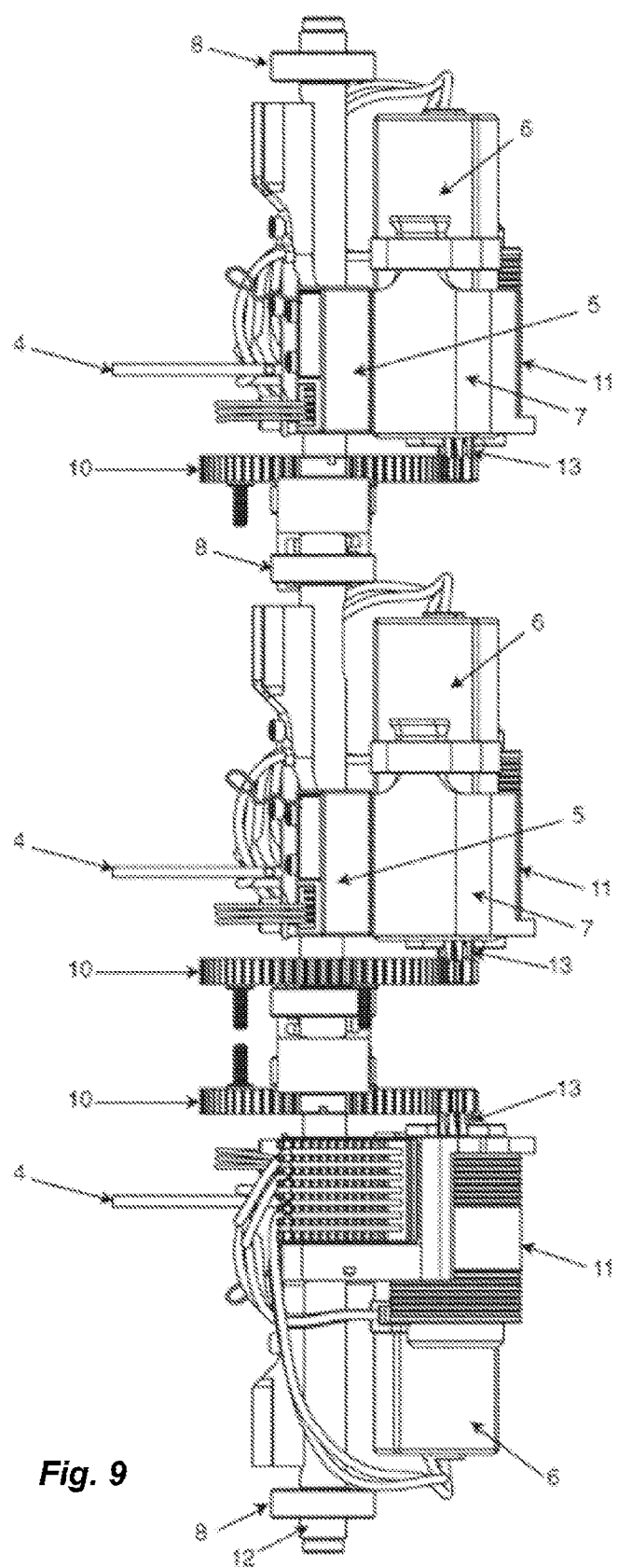
FIG. 9 is a back view of the embodiment of FIG. 1 with the wheels removed.
Figure 10:
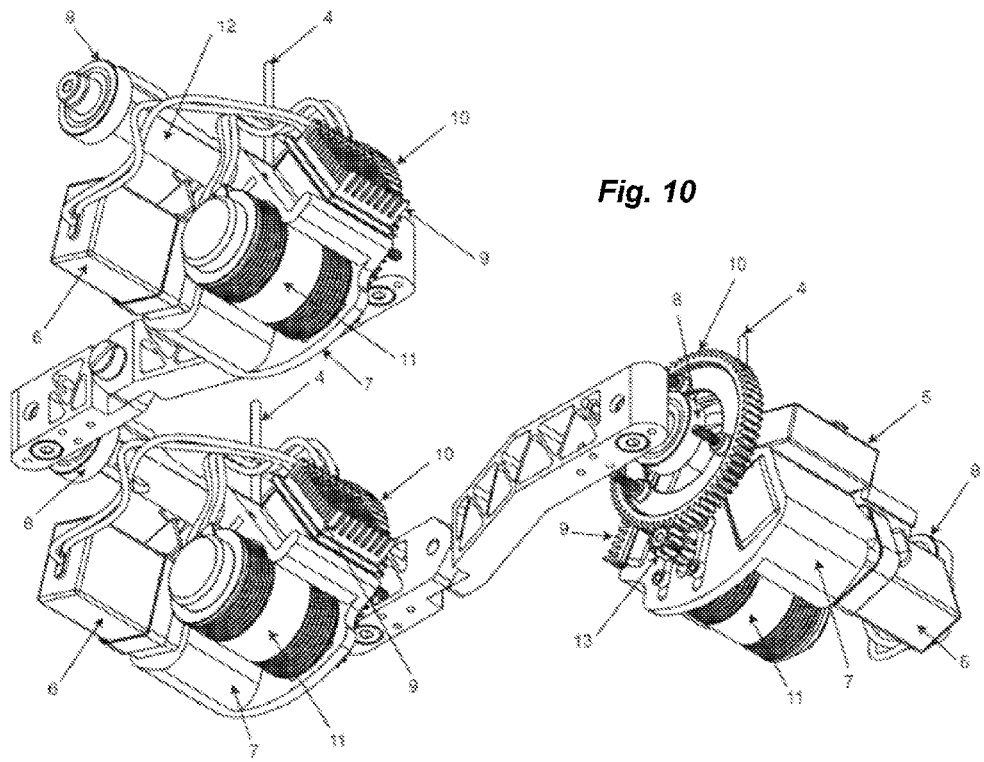
FIG. 10 is a bottom view of the embodiment of FIG. 1 with the wheels removed.

The top view of the three-wheel embodiment displayed in FIG. 5 allows for a clear view of the frame 2 and pivots 1, and also depicts how the small frame 3 allows each wheel 2 to move up and down independently.

FIGS. 6-10 show the wheels and tires 2 removed from view to allow a look into the inside of this embodiment. As discussed previously, this three-wheel embodiment is designed as a remotely operated vehicle (ROV), but this configuration is only an option and is not meant to limit the scope of the invention. FIGS. 6-10 show the main components needed to operate this ROV embodiment, with the exception of the transmitter and the wheels or tires 2. The battery 6 is connected to the motor control or ESC 9. The motor control 9 is connected to both the receiver 5 and the motor 11. The receiver 5 accepts the signal from the transmitter (not shown) and sends that information to the engine/motor control 9 which tells the motor 11 how to operate. These electronics are only an option and are not meant to limit the scope of the invention. Although the present embodiment is described as having a motor 11, a battery 6, and a motor control 9, other embodiments may utilize an engine, a fuel tank, and a throttle.

Also shown in FIGS. 6-10, the frame 3 links the three axles 12 into one unit which is able to pivot on either side by use of the frame pivots 1. Frame mounts 7 hold the electronics to each axle 12. The frame mounts 7 hang the majority of the components below the center point of each axle 12, allowing the vehicle to have an extremely low center of gravity. FIGS. 6-10 also show a small antennae tube 4 that allows the antennae to be positioned towards the top of the vehicle for better reception. Two bearings 8 on each axle 12 allow the wheels 2 to rotate around the axles 12. The motor 11 has a small pinion gear 13 (best viewed in FIG. 8) that drives the spur gear 10. The spur gears 10 are directly attached to the wheels 2. Since the wheels 2 are free to rotate on the axles 12 due to the use of bearings 8, the motor 11 rotates the pinion 13, which drives the spur gear 10, allowing the motor 11 to rotate the wheels 2 and drive the vehicle. The use of a transmission or gearbox is also possible (not shown), but is not necessary to operate the vehicle. For directional turning of this embodiment, the two side motors 11 vary their speed, allowing the vehicle to spin and turn without the need for forward movement like most prior art vehicles. This style of turning a vehicle is similar to the turning of a tank or a skid-steer. Steering in this way is only an option and is not meant to limit the scope of the invention.

Figure 11:
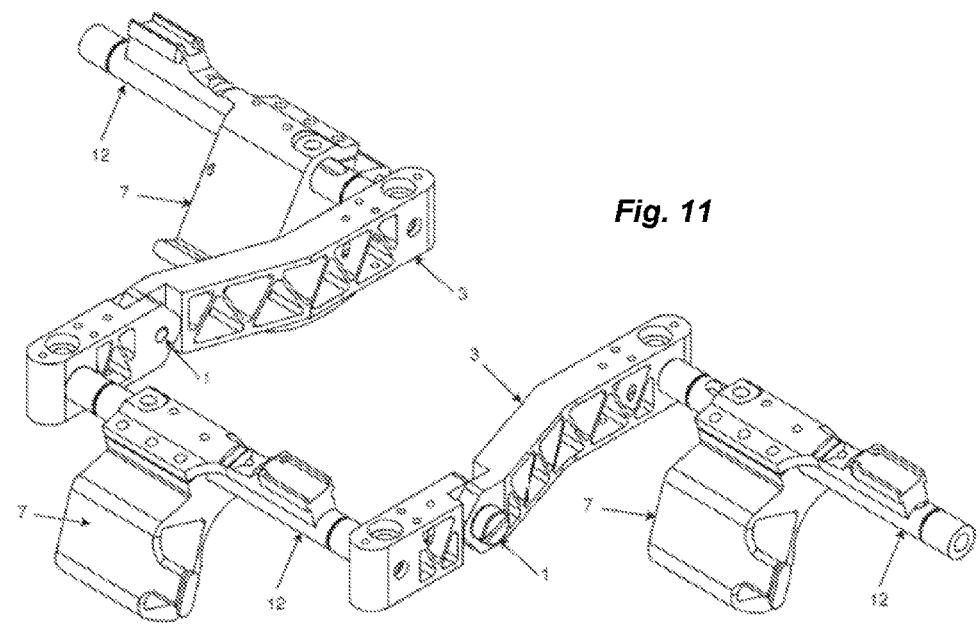
FIG. 11 is an isometric view of the embodiment of FIG. 1 with the frame & mount only.
Figure 12:
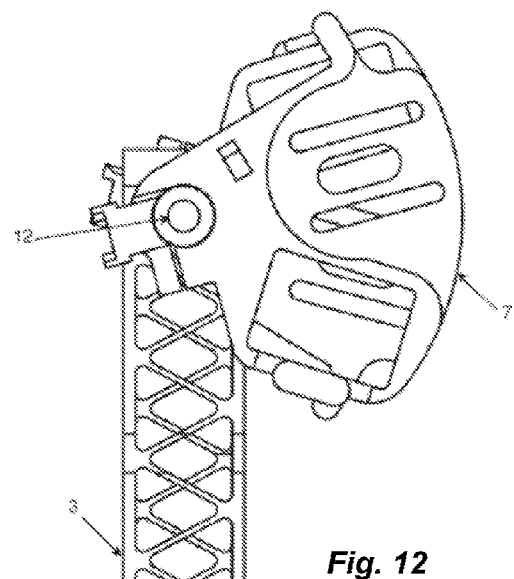
FIG. 12 is a side view the embodiment of FIG. 1 with the frame & mount only.

FIGS. 11-12 show the drive components removed from the three-wheel embodiment of FIG. 1. The frame 3 is shown, together with the axles 12. Also shown are the frame mounts 7. The reason the frame mounts are shown and discussed as separate from the frame 3 is that the frame mounts 7 can be additionally driven (not shown) around the axles to adjust the center of gravity of the vehicle. If the frame mounts 7 were to have an additional motor or servo allowing them to rotate on the axle, then it is possible to simply flip the insides of the vehicle with a button, switch, or other selection device on the transmitter. This configuration (not shown) would allow the center of gravity to reverse itself if the vehicle were to be flipped upside-down, creating a vehicle that not only has no front or back, but also no top or bottom. Flipping the vehicle upside down would not affect the function of the vehicle in any meaningful way. The user would simply press a button, flip a switch, or otherwise cause the transmitter to send an appropriate command to the receiver 5, which would then cause the insides of the vehicle to internally relocate (for example, by rotating around the axle) to restore the low center of gravity. It is also possible to flip the internal components by using gravity alone and a simple locking feature, activated by a sensor that detects that the vehicle has flipped over or by a remote switch, to keep the internal components in the proper location. Alternatively, a solenoid or linear actuator can be used to operate the internal flipping feature (not shown). A combination of these methods can also be employed to lower the center of gravity if the vehicle is flipped upside down. It is important to note that without this internal flipping feature (not shown), the vehicle will still function properly after being flipped upside down, except that the center of gravity will be higher than normal for the vehicle.

Figure 13:
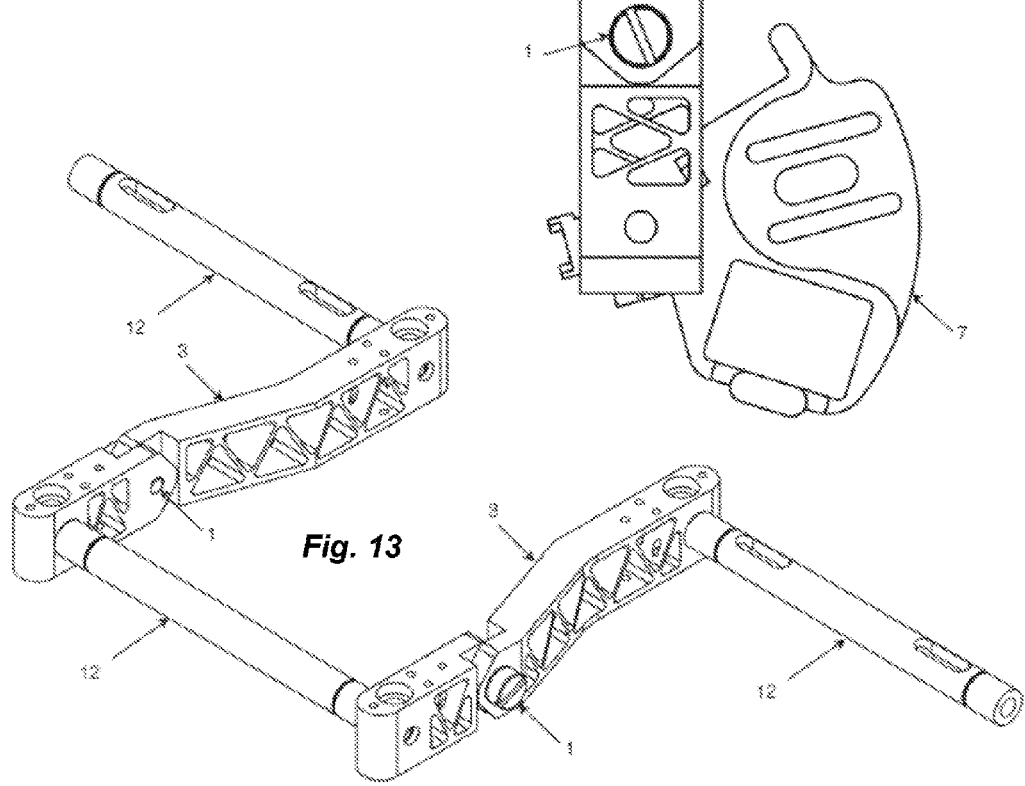
FIG. 13 is an isometric view of the embodiment of FIG. 1 with the frame only.
Figure 14:
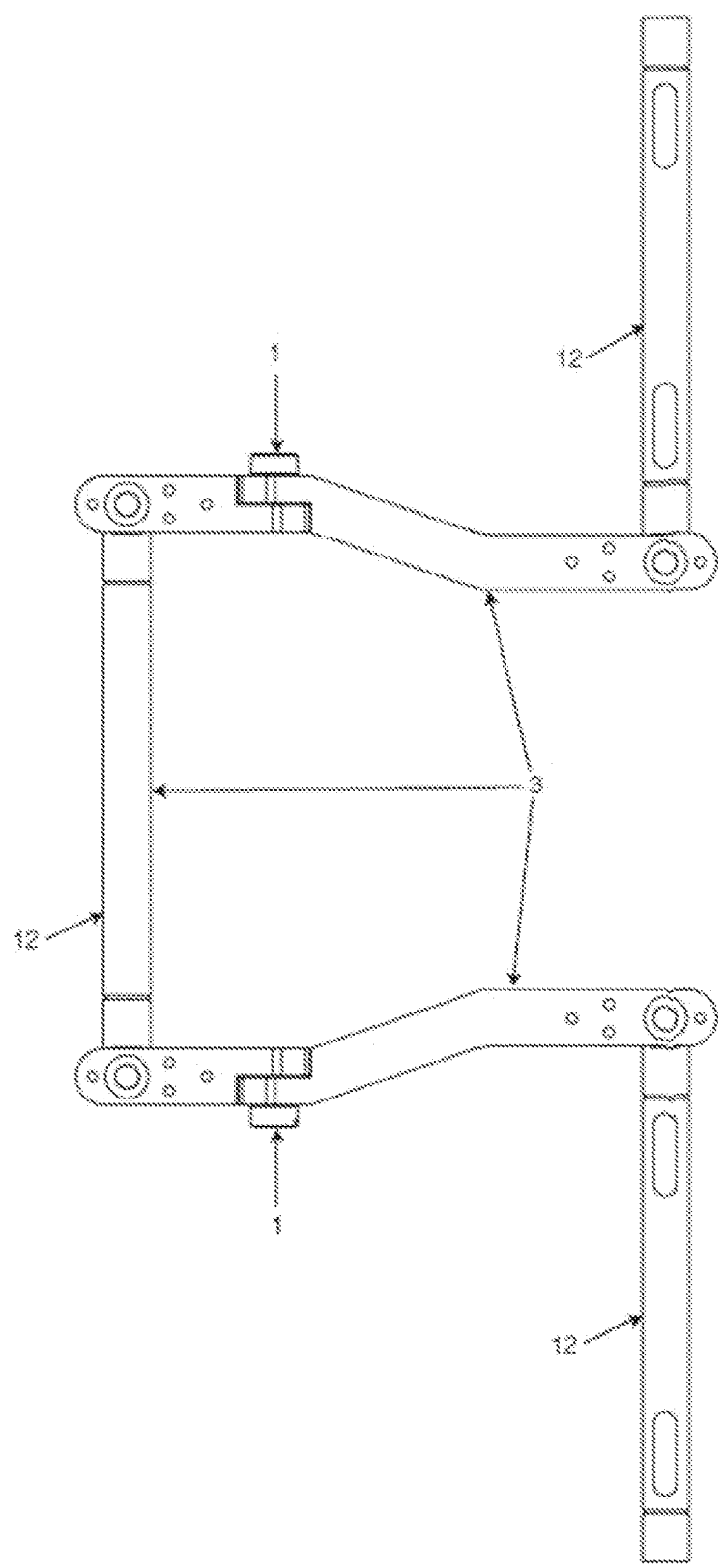
FIG. 14 is a top view of the embodiment of FIG. 1 with the frame only.

FIGS. 13-14 show the three-wheel embodiment of FIG. 1 with the frame mounts 7 removed from view. FIGS. 13-14 represent the entire frame of this embodiment, including the axles 12 and the frame pivots 1. These views allow for a better understanding of the difference between the frames of embodiments of the present disclosure and the frames of prior art vehicles. It is also important to note that frame pivots 1 are only an option and are not meant to limit the scope of the invention.

Figure 16A:
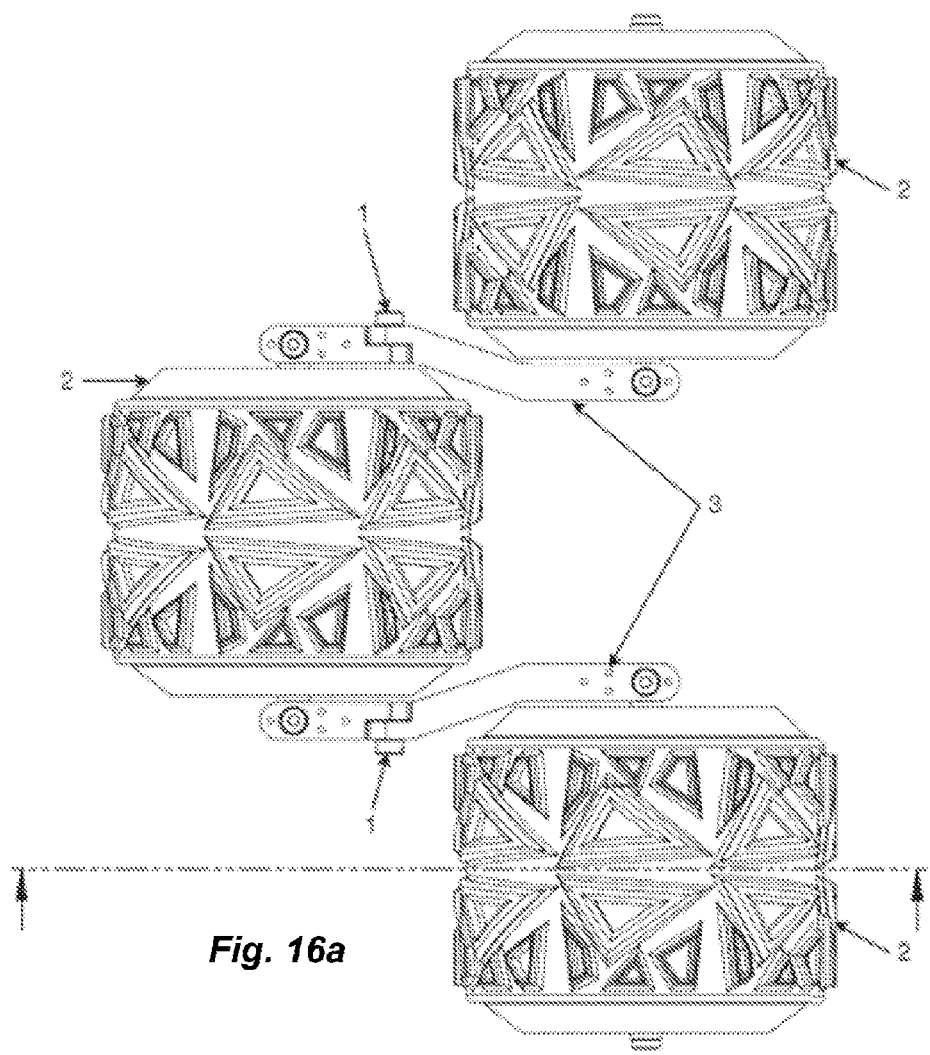
FIGS. 16a-b depict another section view of the embodiment of FIG. 1.
Figure 16B:
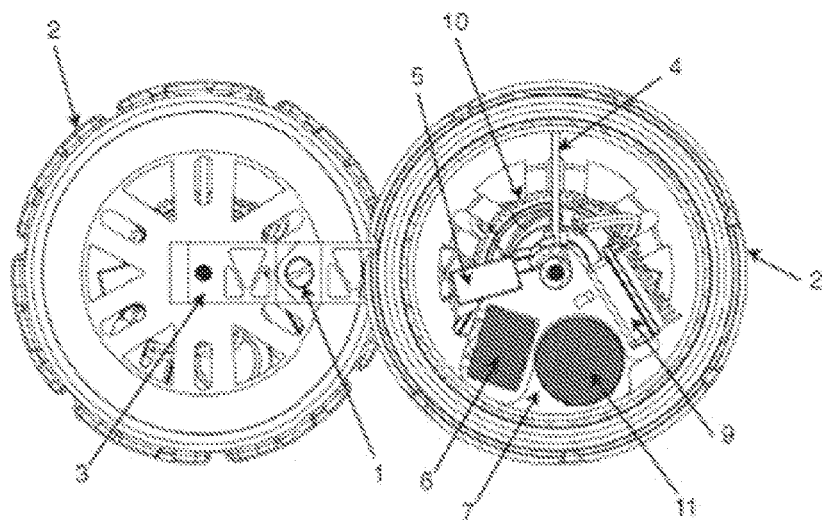

The sectional views in FIGS. 15-16 better show the weight distribution (center of gravity) of embodiments of the present disclosure. As discussed previously, the bulk of the vehicle's weight and components are located below the height of the axle 12 and inside the wheels 2. This allows for the center of gravity to be extremely low as compared to prior art vehicles. FIG. 16 shows this best. The two heaviest single components in typical embodiments of the present disclosure are the motor 11 and the battery 6, which are extremely low to the ground. When such embodiments encounter an object or an obstruction, the large wheels 2 will allow the motor 11 and battery 6 to maintain their low position, but still drive over the object. Also, it should be appreciated that either the right side or the left side of FIG. 15b may correspond to the bottom of the vehicle. In some embodiments, the right side of the vehicle corresponds to the bottom of the vehicle so that the motor(s) 11 and battery 6 are positioned beneath the axles 12 of the wheels 2, thereby maintaining a low center of gravity for the vehicle.

Figure 17:
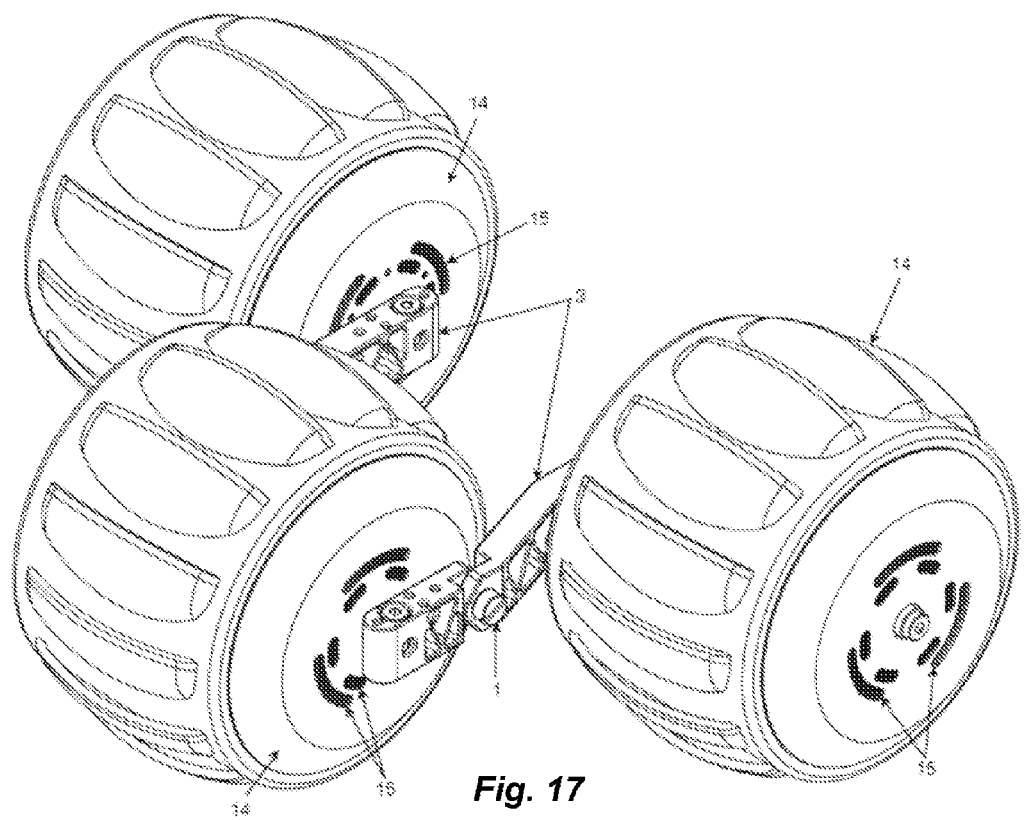
FIG. 17 is an isometric view of an embodiment of the present disclosure.
Figure 18A:
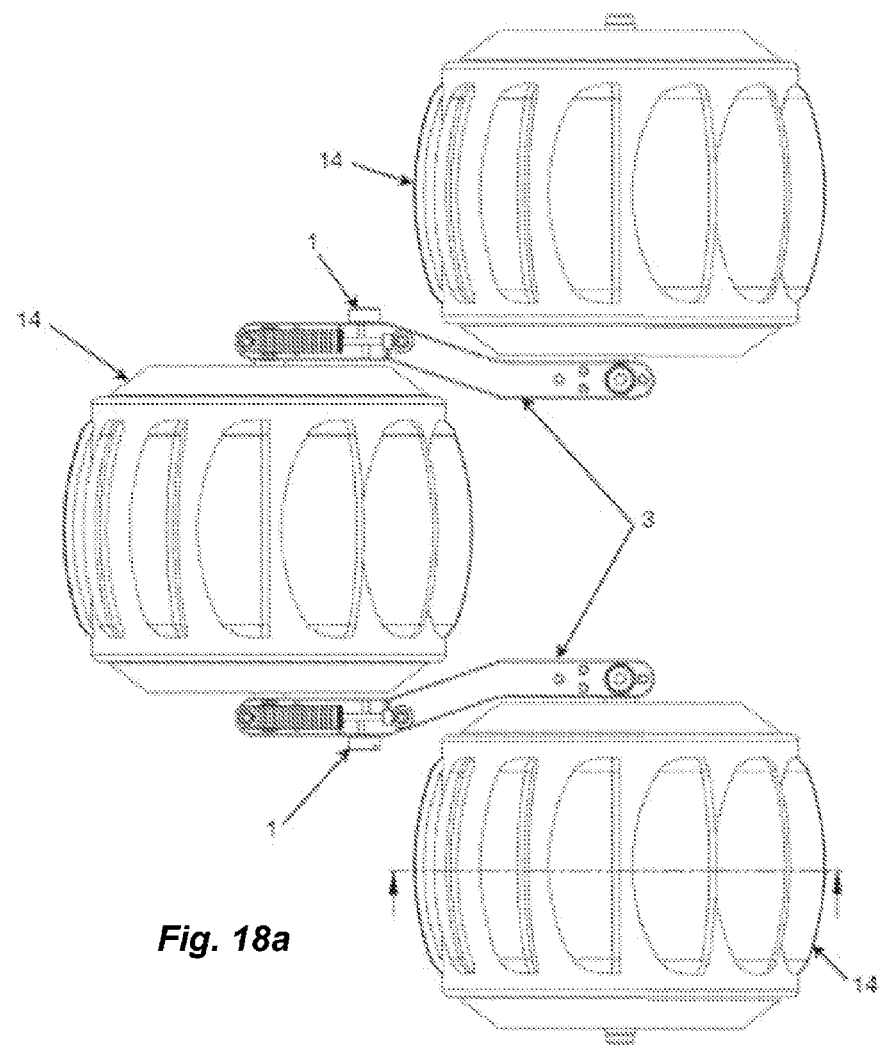
FIGS. 18a-b depict a section view of the embodiment of FIG. 17.
Figure 18B:
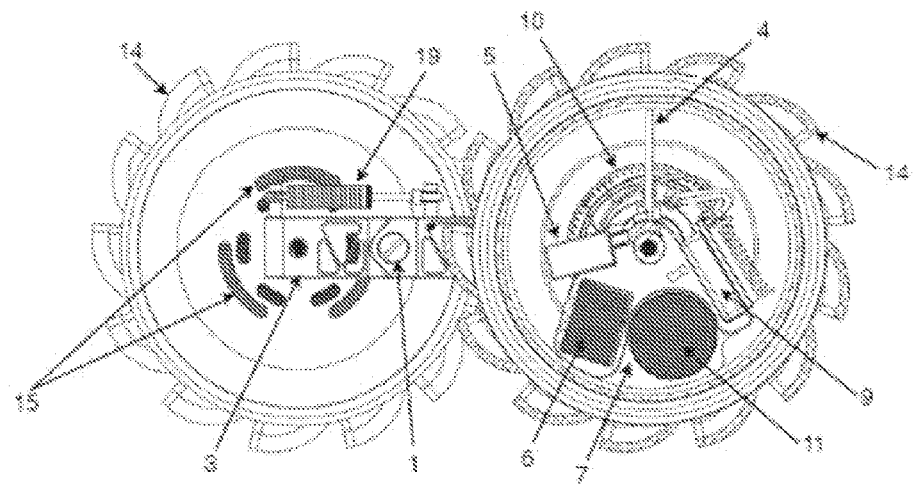

FIGS. 17-18 show a three-wheel embodiment similar to the embodiment of FIG. 1 but that uses waterproof wheels 2 that prevent water or liquid from entering the inside of the wheels 2. With the correct weight to air-cavity distribution (buoyancy), this embodiment is able to both float and propel itself on water. The amphibious embodiment is identical to the previously described embodiment of FIGS. 1-16 with the exception of adding a waterproof seal to the interior of the wheels and, optionally, changing the tires 14 to a more scooped design, allowing for better propulsion on the water. The steering of the amphibious embodiment is accomplished in the same manner as the previously described embodiment, i.e. slowing one side of the vehicle and speeding up the other.

All embodiments of the present disclosure can be used on either land or water (given an acceptable weight to air-cavity distribution (buoyancy)) by simply sealing the wheels. This sealing may be accomplished with a semi-permeable membrane 15 that is permeable to air but impermeable to water. Use of such material allows the motors 11 and other internal mechanisms to be air cooled while preventing liquid from entering the wheels 2. This semi-permeable membrane 15 is only an option and not meant to limit the scope of the invention. Alternative ways to cool the internal mechanisms in each wheel 2 include using liquid cooling or air conditioning, creating a cooling effect for the motors 11, batteries 6, and other internal components while still allowing the wheels 2 to be sealed for amphibious driving.

FIG. 18 additionally displays the use of an external shock absorber 19. Unlike prior art vehicles, embodiments of the present disclosure do not require the use of shock absorbers to allow the wheels to move independently of each other or to move at all. Prior art vehicles use shocks and springs to allow the wheels to move up and down over bumps and dips notwithstanding the weight of the vehicle. Embodiments of the present disclosure have the majority of their weight in the wheels 2 themselves, allowing for a completely different way of looking at the use of shock absorbers and springs 19. In this variation, the shock absorber 19, placed on its side, does not have any vehicle weight riding on it when the wheel is not riding over a bump or a dip. Unlike prior art vehicles, embodiments of the present disclosure employ a two-way shock absorber 19, i.e. a shock absorber having two opposing springs. One spring applies force when the wheel 2 moves upward in relation to the other wheels 2. The other spring applies force when the wheel 2 moves downward in relation to the other wheels 2. The absorber portion of the shock can remain the same, applying resistance and slowing movement in either direction. A horizontally placed shock and spring setup 19 with two-way springs is only an option and is not meant to limit the scope of the invention.

Shocks and springs may be used in many configurations on embodiments of the present disclosure, including in configurations that may not be possible on prior art vehicles. Shock absorbers 19 can be applied to all embodiments of the present disclosure, but are not required. The use of internal shock absorbers within the wheels 2 can also be used (not shown) to improve the safety of the components or people within the wheels 2.

Figure 19:
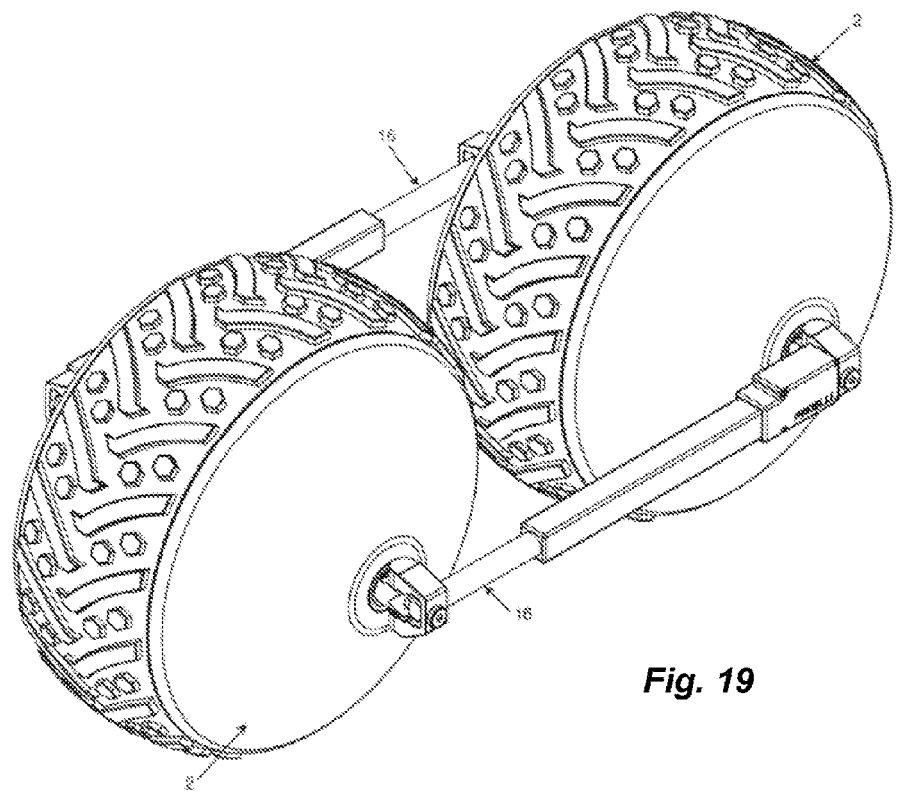
FIG. 19 is a side view of an embodiment of the present disclosure.
Figure 20A:
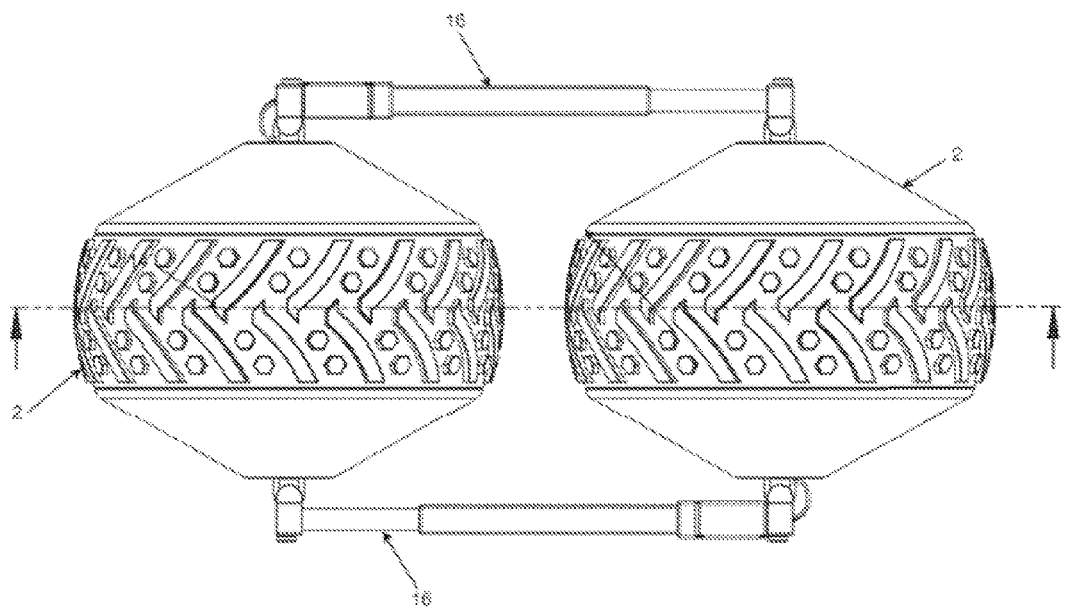
FIGS. 20a-b depict a section view of the embodiment of FIG. 19.
Figure 20B:
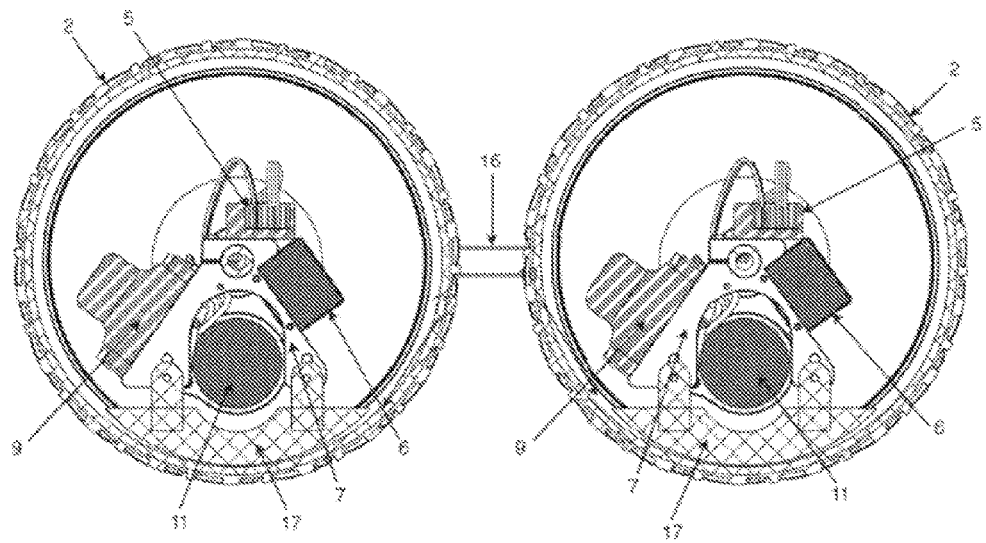
Figure 21:
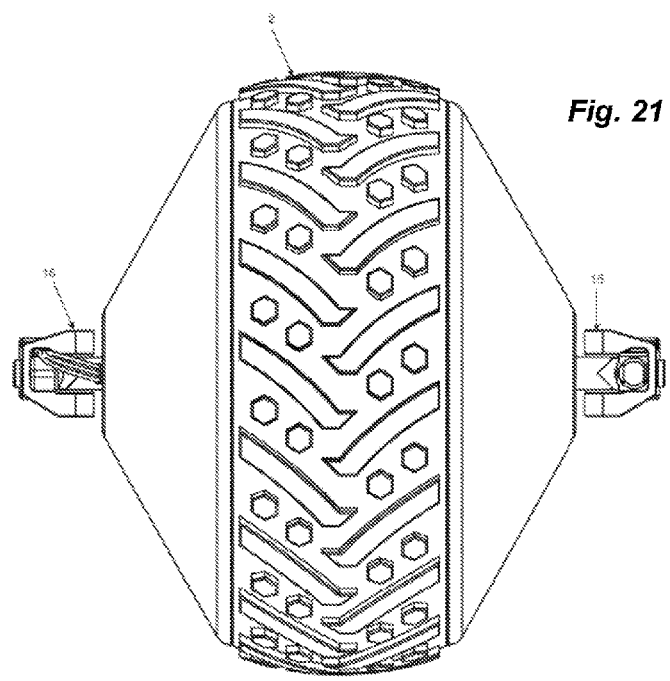
FIG. 21 is a front view of the embodiment of FIG. 19.

FIGS. 19-27 show other embodiments of the present disclosure, including embodiments with different wheel configurations. FIGS. 19 through 21 present a two-wheel embodiment that, like all embodiments of the present disclosure, has a lower center of gravity than typical prior art vehicles. This lower center of gravity allows the two-wheel embodiment to remain upright while not moving, i.e. it will not fall over as would, for example, a motorcycle. The sectional view in FIG. 20 shows the majority of components located below the axles and inside the wheels 2. FIG. 20 also shows the use of an optional weight 17 that further lowers the center of gravity. This optional weight 17 can also be utilized with other embodiments of the present disclosure, but is only an option and is not meant to limit the scope of the invention.

As mentioned earlier in the document, steering by adjusting the speed of one or more motors 11 is only an option. As one non-limiting example, steering in various embodiments of the present disclosure can also be accomplished by use of a typical steering rack (i.e. a rack and pinion) as used on the majority of prior art vehicles. Components of a rack and pinion system, if used, would likely need to be installed outside of the wheels 2. Linear actuators 16 provide another one of the many options for steering embodiments of the present disclosure. By extending one linear actuator 16 but not the other, the wheels 2 can be turned relative to each other, thus providing directional control to the vehicle.

Linear actuators 16 can also be used to adjust the overall wheel base length, thus creating additional benefits. Due to the simplicity of the frames 3 of embodiments of the present disclosure, the length of the frames 3 can easily be adjusted, even during operation, with the use of linear actuators 16. Adjusting wheel base can have many advantages, including but not limited to improving the vehicle's ability to climb stairs by lengthening the frame length, improving the vehicle's high speed performance by reducing the frame length, and allowing a vehicle stuck in mud or ruts to simply push out of the mud or ruts by lengthening the wheel base.

Figure 22A:
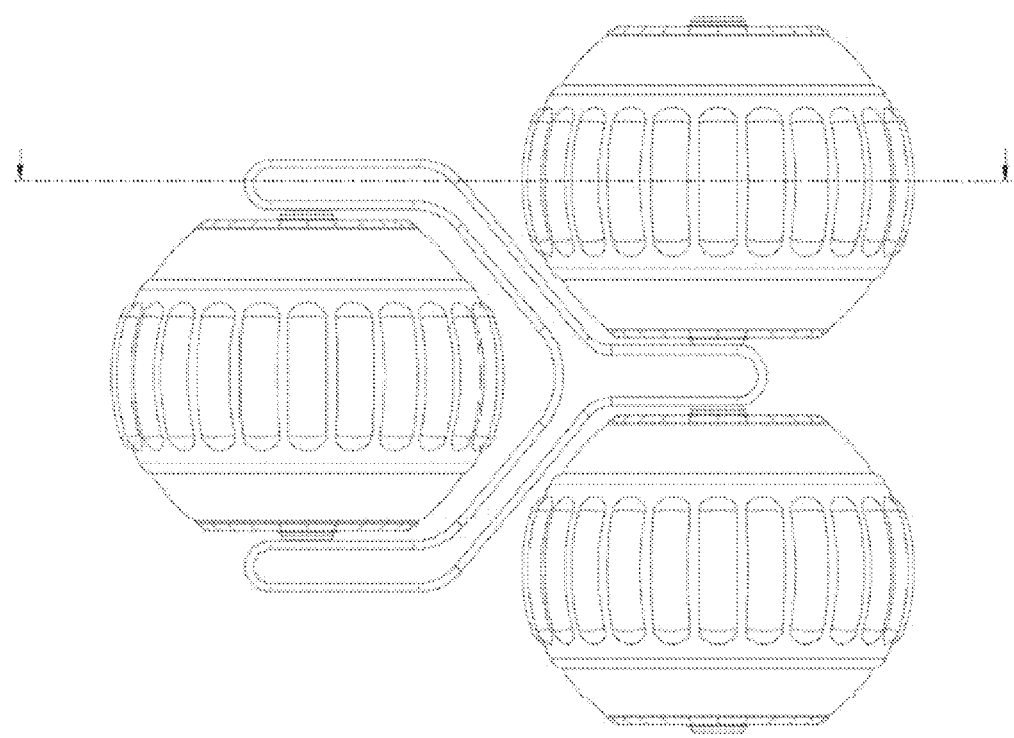
FIGS. 22a-b depict a section view of another embodiment of the present disclosure.
Figure 22B:
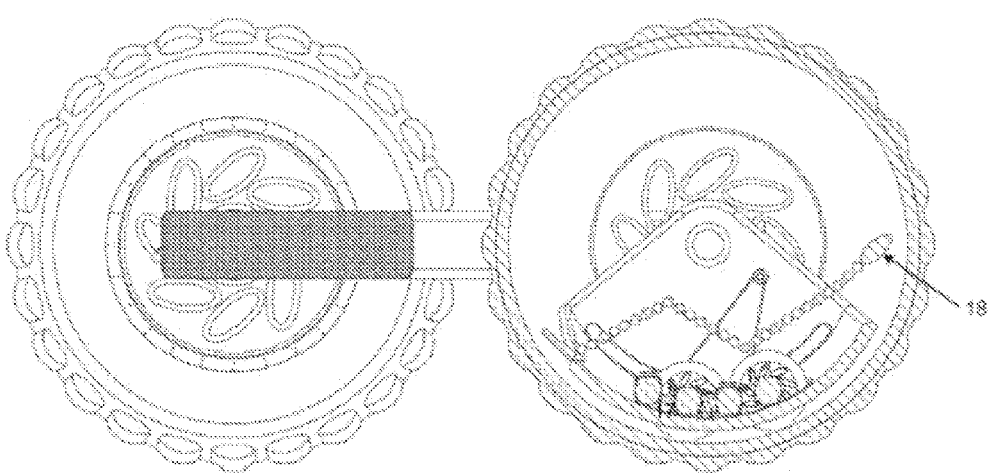
Figure 24:
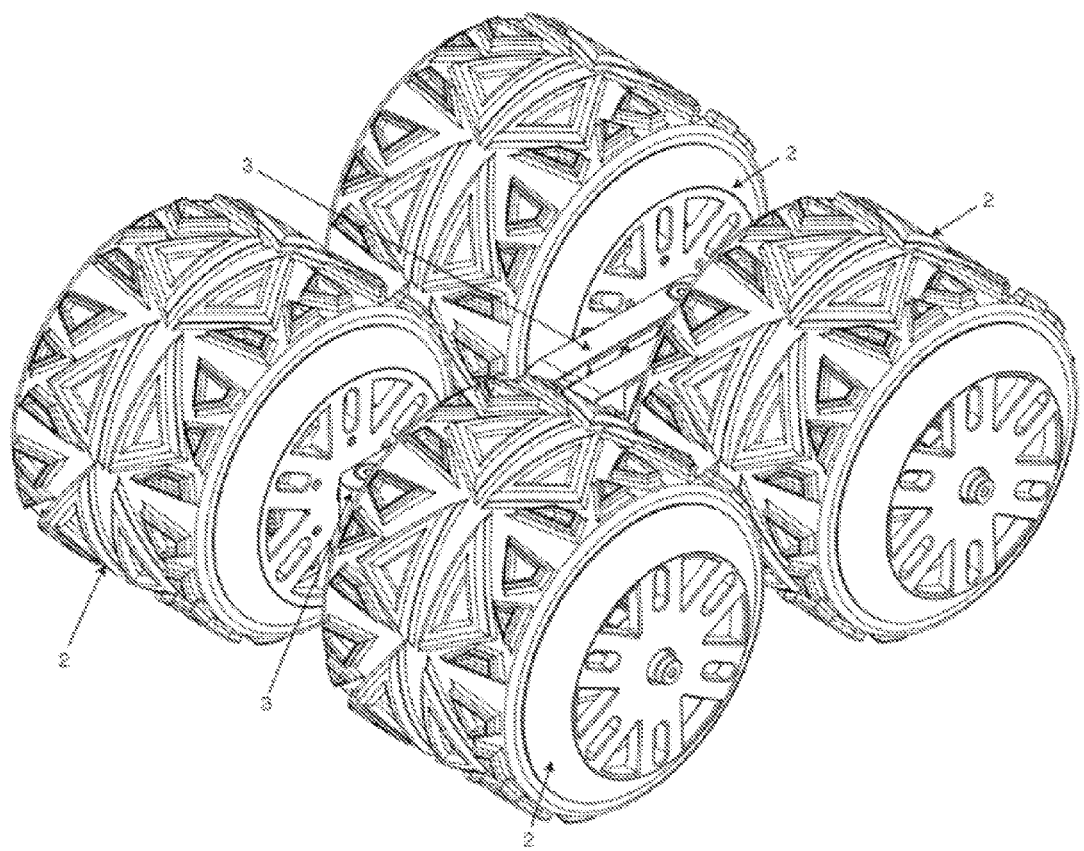
FIG. 24 is an isometric view of another embodiment of the present disclosure.
Figure 25:
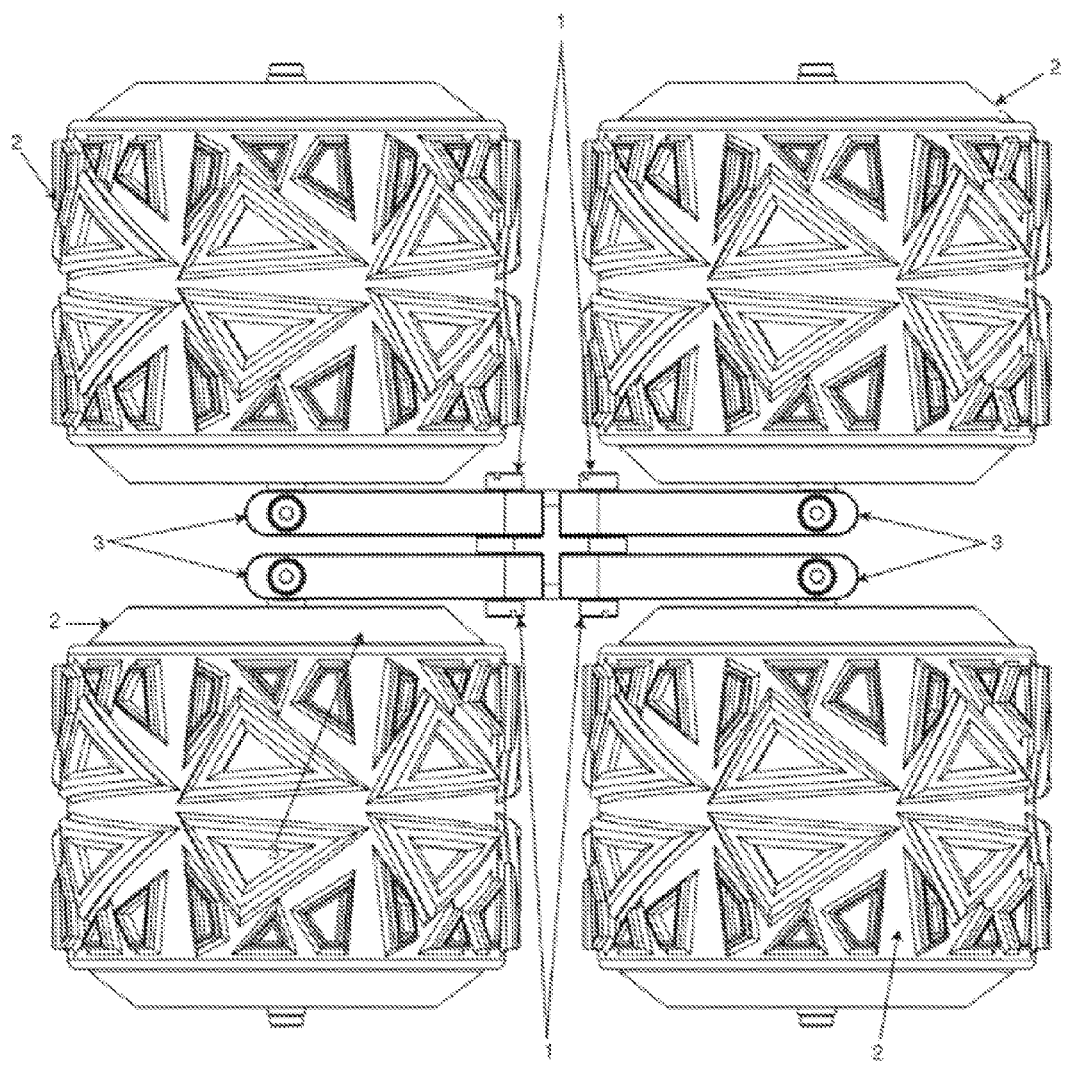
FIG. 25 is a top view of the embodiment of FIG. 24.
Figure 26:
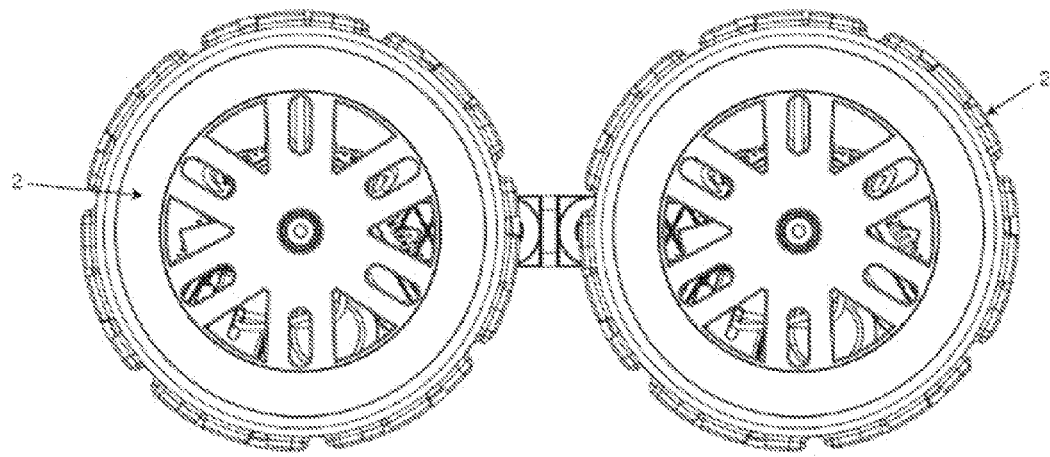
FIG. 26 is a side view of the embodiment of FIG. 24.
Figure 27:
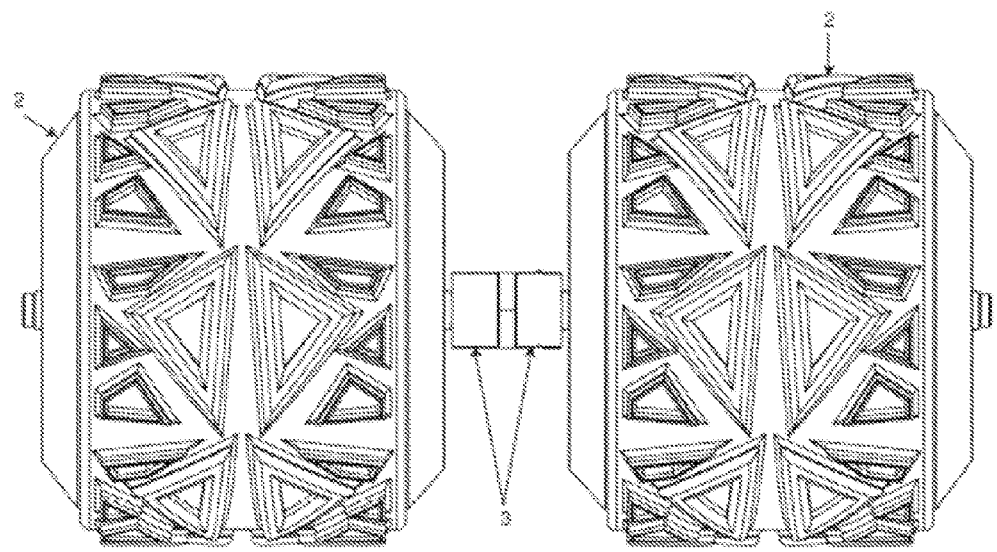
FIG. 27 is a back view of the embodiment of FIG. 24.
Figure 28A:
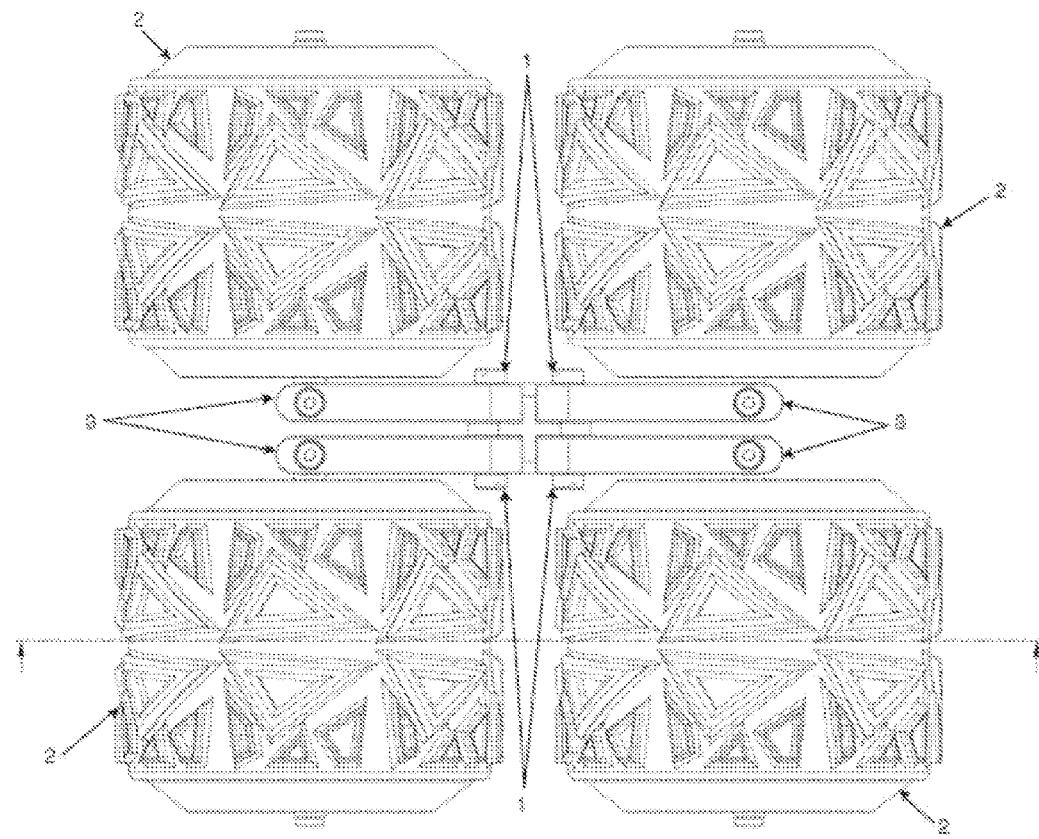
FIGS. 28a-b depict a section view of the embodiment of FIG. 24.
Figure 28B:
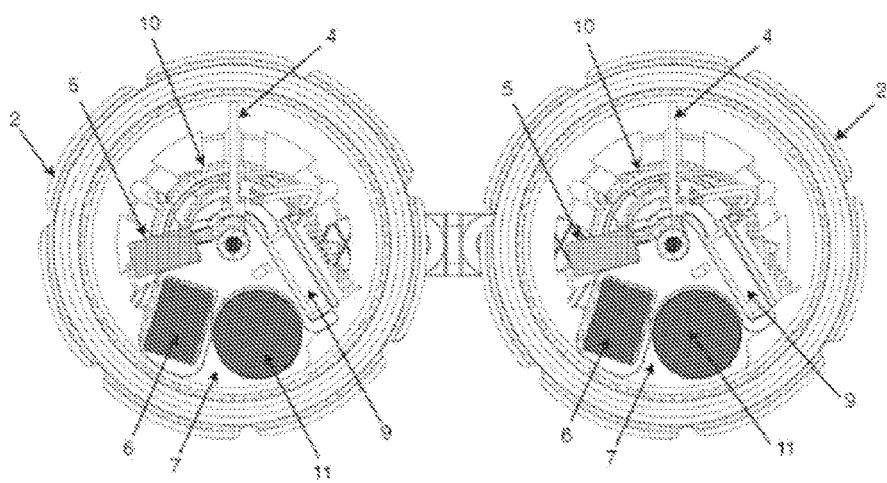
Figure 29:
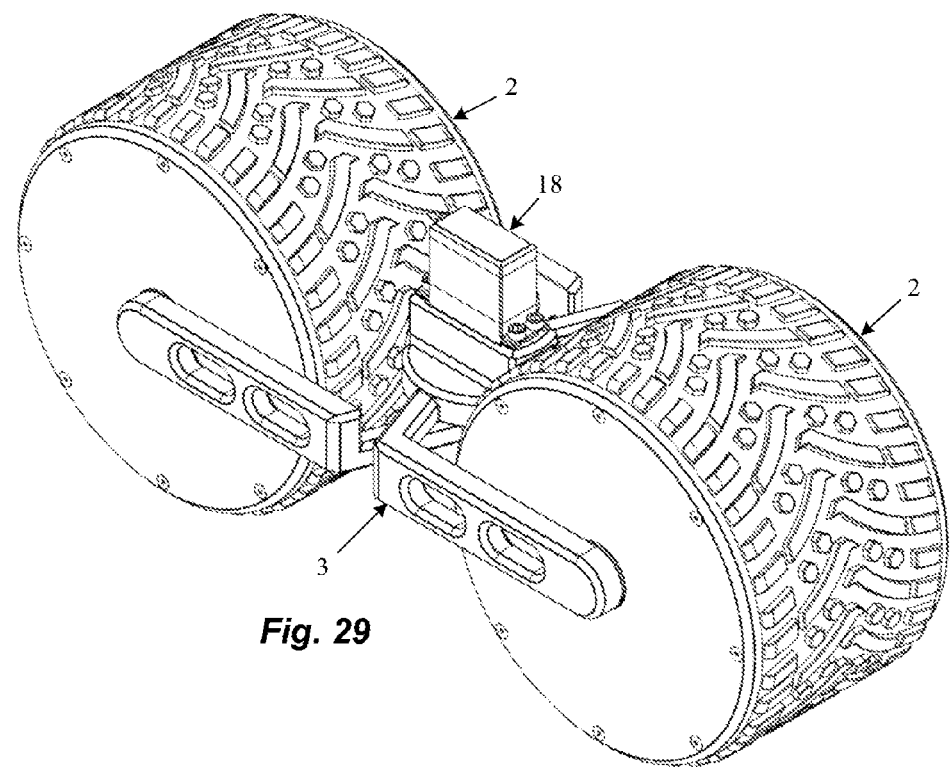
FIG. 29 is an isometric view of another embodiment of the present disclosure.
Figure 30:
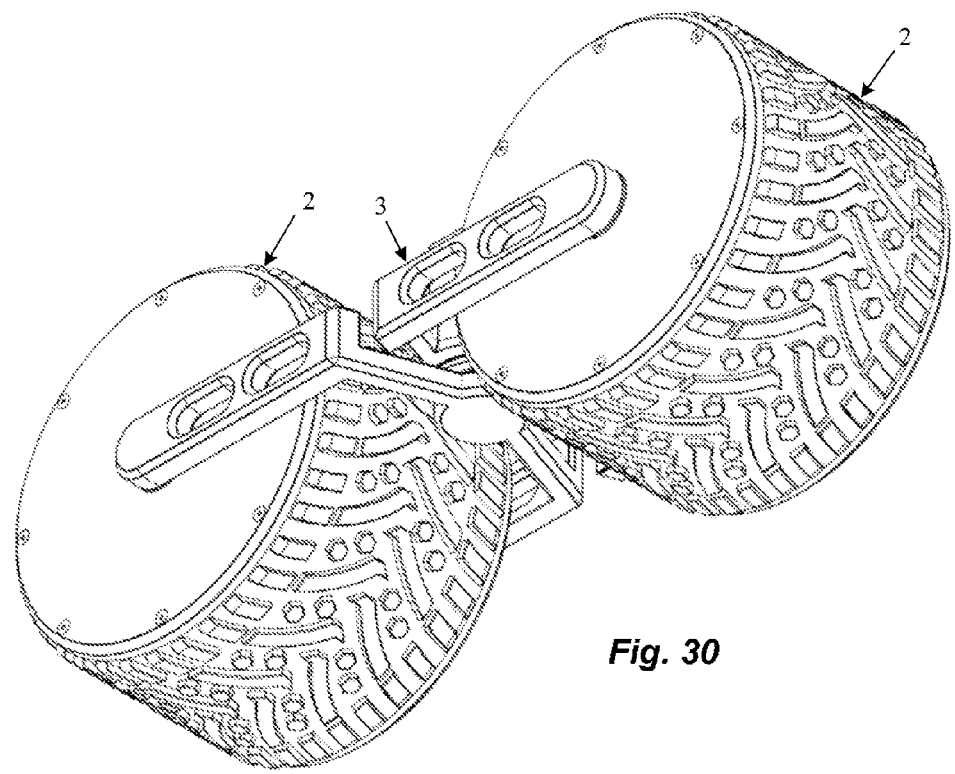
FIG. 30 is another isometric view of the embodiment of FIG. 29.
Figure 33:
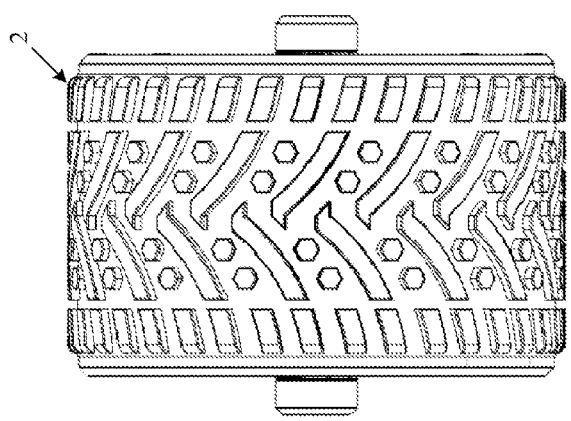
FIG. 33 is a front view of the embodiment of FIG. 29.
Figure 32:
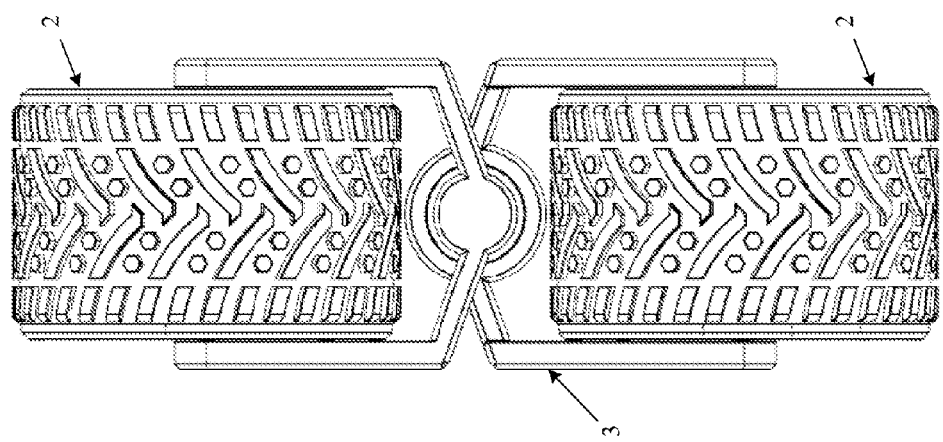
FIG. 32 is a bottom view of the embodiment of FIG. 29.
Figure 31:
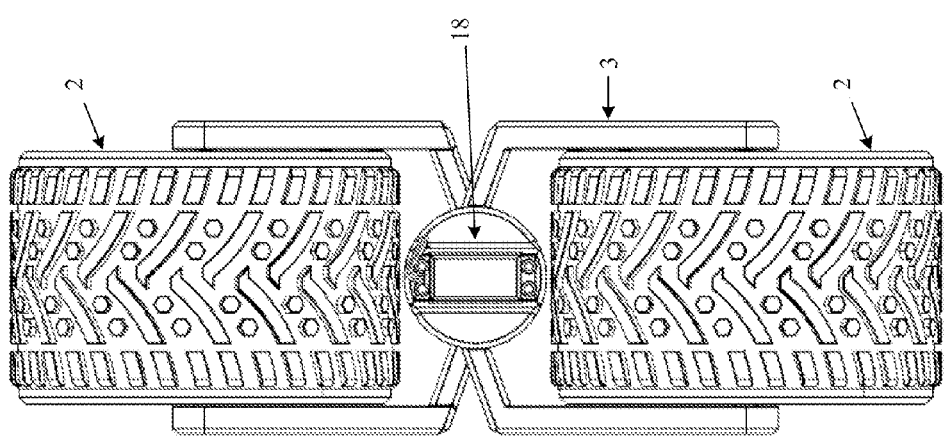
FIG. 31 is a top view of the embodiment of FIG. 29.
Figure 34:
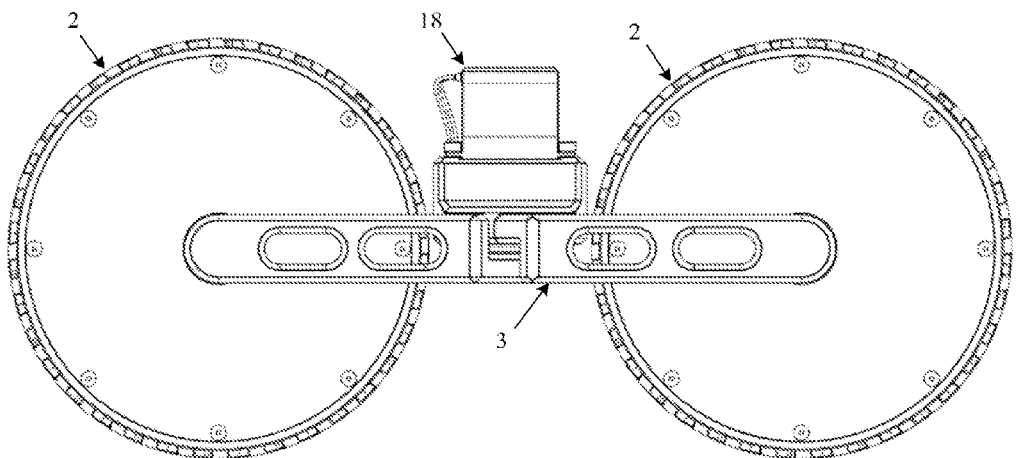
FIG. 34 is a side view of the embodiment of FIG. 29.
Figure 35:
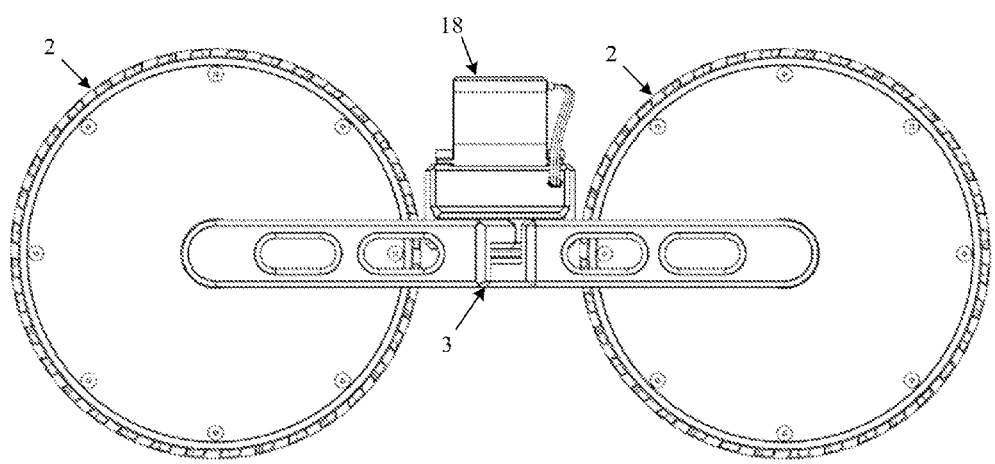
FIG. 35 is another side view of the embodiment of FIG. 29.
Figure 36:
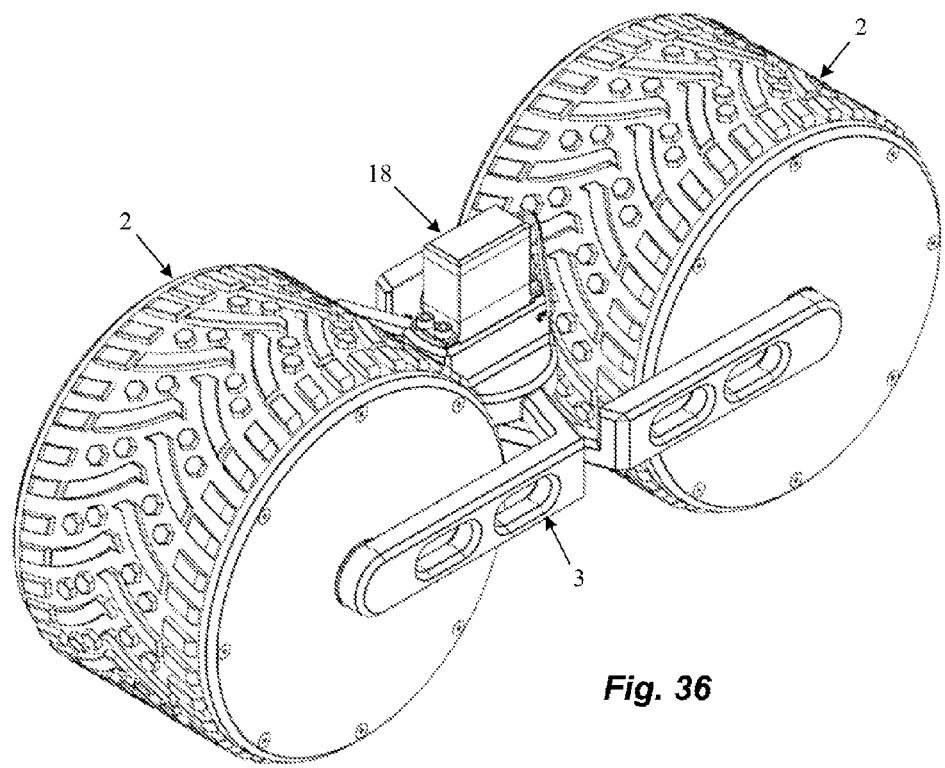
FIG. 36 is another isometric view of the embodiment of FIG. 29.
Figure 37:
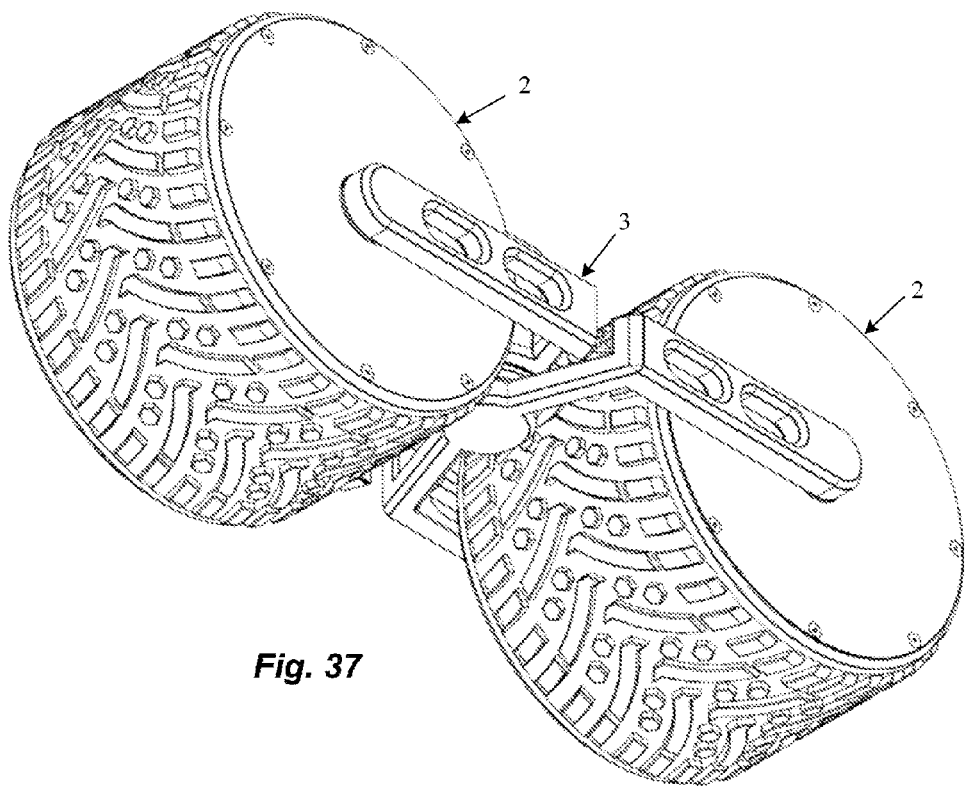
FIG. 37 is another isometric view of the embodiment of FIG. 29.

FIGS. 22a-b present an embodiment of the present disclosure that is built to move people. Although depicted only in connection with this three-wheel embodiment, any embodiment of the present disclosure can be adapted to carry one or more persons. The chair 18 shown in FIG. 22b allows a person to drive the vehicle from within the wheel 2 itself, which further lowers the vehicle's center of gravity. As persons of ordinary skill in the art will recognize, equipment specific to the remote operation of a vehicle is not required in embodiments of the present disclosure adapted to be control by a person within the vehicle. Some embodiments, however, include equipment for both remote operation and direct control, thus allowing the vehicle to be used in different ways to meet the requirements of a particular purpose or mission.

Figure 23:
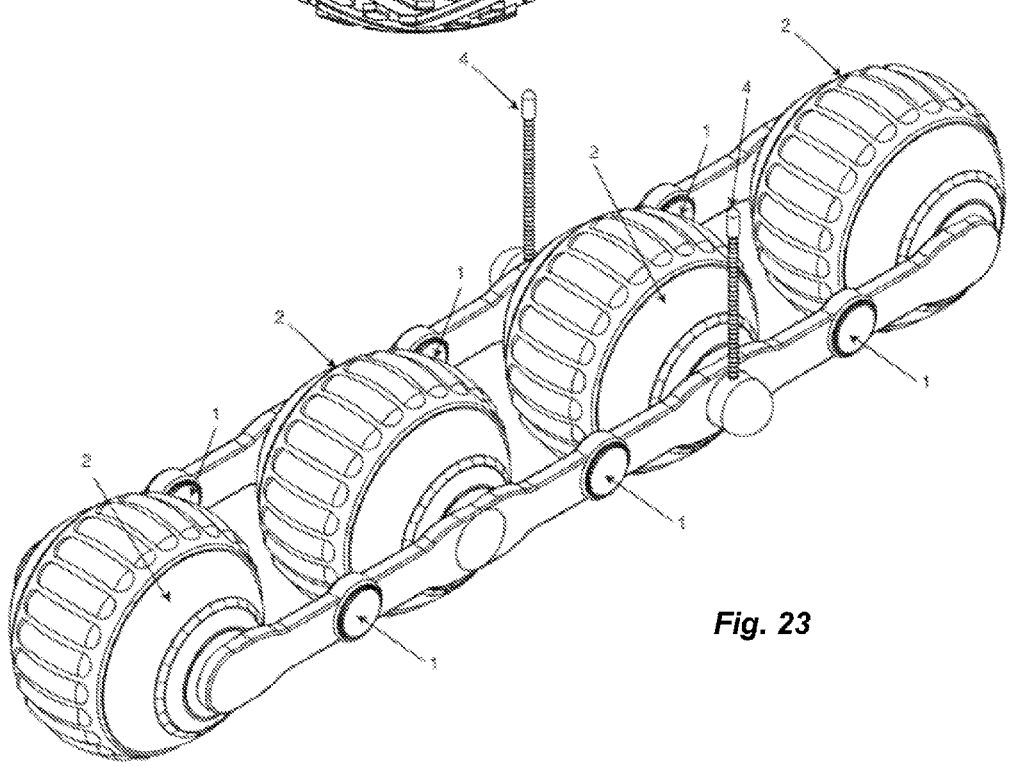
FIG. 23 is an isometric view of another embodiment of the present disclosure.

FIG. 23 presents another embodiment that, similar to the two-wheel variation shown in FIGS. 19-21, has linearly aligned wheels 2. In other words, the wheels 2 are in line with each other, as are the wheels of a motorcycle. This embodiment differs from the embodiment depicted in FIGS. 19-21 in that it employs four wheels 2. Hinged joints 1 on the frame 3 between each wheel 2 allow each wheel 2 to move up and down with varying terrain. This embodiment, as with other embodiments, is not limited to the number of wheels shown.

FIGS. 24-28 display another important embodiment of the present disclosure, which has four wheels 2 in an arrangement similar to that of a typical car. Directional control of this embodiment is provided by independently adjusting the speed of the left-side and right-side wheels 2, similar to the way a tank directionally steers. This steering option is, once again, only an option and is not meant to limit the scope of the invention. The embodiment shown in FIGS. 24-28 has four (optional) separate hinge points 1, allowing all four wheels 2 to move up and down independently from each other. As best seen in FIG. 28b, in this embodiment, as in other embodiments described herein, as much of the vehicle's weight as possible is located inside the wheels 2 and below the axles 12. The four-wheel embodiment provides advantages and disadvantages over the three-wheel embodiment of FIG. 1. One disadvantage is the lack of a center wheel 2 for use as a pivot for steering. The four-wheel embodiment can still turn quickly, but not as easily and with more friction than the three-wheel embodiment of FIG. 1. One advantage is that the additional wheel provides a balanced front and back, resulting in a vehicle without a front end or back end. This, in turn, allows the four-wheel embodiment to have the same driving characteristics in both forward and reverse. Another advantage of the four-wheel embodiment relative to the three-wheel embodiment is that the fourth wheel 2 provides additional traction, i.e. for climbing steep terrain. Additionally, in some embodiments, the wheels can be offset from one another. In particular, the left wheels (e.g., left two, three, four, or more wheels) can be slightly offset relative to the right wheels such that the center of rotation of one wheel does not coincide with a center of rotation of another wheel. Then, for example, when the vehicle encounters a challenging obstacle, only one wheel of the vehicle encounters the challenging obstacle at a time. As with other embodiments depicted herein, the side-by-side arrangement of the wheels 2 depicted in FIGS. 24-28 is not limited to four-wheel embodiments of the present disclosure. An embodiment having, for example, six or eight wheels 2 can also utilize a side-by-side wheel arrangement while providing greater traction and/or buoyancy for various applications.

FIGS. 29-37 depict yet another embodiment of the present disclosure, having two wheels 2. The frame 3 of this embodiment comprises two components, each connected to a wheel 2 and pivotally connected to each other. A motor or servo 18 is attached to the frame 3 and configured to rotate the components of frame 3 relative to each other, thus providing directional control to the vehicle. In some embodiments, the motor or servo 18 may be equipped with its own receiver and control system, while in other embodiments the motor or servo 18 may be in wired communication (i.e. through one or both components of frame 3) with a receiver and control system with one or both wheels 2. The frame 3 and/or motor or servo 18 may also be equipped with a damper system to prevent unwanted rotation of the components of frame 3 around the pivot point. Although this pivoting frame 3 is shown in connection with a two-wheeled vehicle, a pivoting frame may also be used in vehicles having more than two wheels.

Embodiments of the present disclosure may utilize wheel tilting or leaning suspension systems. The suspension system may be tuned to provide even wheel lean, or it may be controlled automatically or manually. Additionally, the suspension may be configured to provide proper wheel lean regardless of whether the vehicle is moving forward or backward.

It is important to note that the present disclosure describes a platform for a vehicle structure that lowers the center of gravity, allowing for improved climbing of obstacles and improved cornering capability. The platform is not limited to the size or type of motors (or engines) used, the electronics displayed in this document, the configuration of the electronics, or the vehicle propulsion methods. Nor does the platform limit the amount or type of additional sensors or electronics that may be used together with the vehicle structure described herein. As one non-limiting example, a people mover embodiment of the present disclosure may employ cameras with monitors to allow the driver to operate the vehicle from within one of the wheels 2. As another non-limiting example, remote cameras or weapons systems not shown in this document may be added to embodiments of the present disclosure. Even mechanical arms and sensors (i.e. for bomb disposal or other hazardous operations) may be included in embodiments of the present disclosure.

Embodiments of the present disclosure have many applications, some of which are discussed above. As another non-limiting example, each soldier in a small group could carry a single wheel 2 and/or a portable frame 3 (or portable elements to construct a frame 3). The wheels 2 could be combined on or off the battlefield with the frame 3 in various configurations to create a variety of functional vehicles for use as the need arises. Because the majority of the drive components are contained within the wheels 2, such that each wheel is self-powered, it is possible to use a single set of a plurality of wheels 2 to create a variety of different embodiments of the present disclosure to perform various functions, all from the same set. By incorporating quick-attach features for the axles 12 of each wheel (even tool-less quick-attach features), the wheels 2 may be easily moved into different configurations on a variety of frames 3, as need to accomplish various applications. For example, three wheels 2 could be configured into a small UGV (unmanned ground vehicle) for scouting ahead, while using another three self-powered wheels 2 to carry extra weight like ammunition. Then, when the need arises, all six wheels 2 from both vehicles could be attached to two backpack frames to create a motorized stretcher for an injured soldier. This same motorized stretcher could become a high speed platform to move a sniper into position, while staying extremely low to the ground to avoid detection. As another example, an embodiment of the present disclosure could be used to move a heavy weapon into place, then the wheels 2 could be removed from the vehicle and reconfigured as needed for use on the battlefield as an ROV or to move additional heavy weapons into place without the need to create an entire vehicle structure for each weapon platform.

As yet another example, in some embodiments of the present disclosure the frame 3 and/or another component of the vehicle is equipped with magnets sufficiently strong to support the weight of the vehicle. In such embodiments, the vehicle can travel vertically or upside down over metal surfaces, with the magnets providing sufficient attractive force to the surface to overcome the force of gravity. Such embodiments could also, for example, be adapted for travel over water as previously described herein, and could then climb up the hull of a ship for emergency response, reconnaissance, surveillance, or other purposes. These are but a few of the many options for embodiments of the present disclosure and are not meant to limit the scope of the disclosure. Indeed, vehicle platforms described herein may be combined with numerous technologies to fulfill a wide variety of purposes or missions.

Specific details were given in the description to provide a thorough understanding of the embodiments. However, it will be understood by one of ordinary skill in the art that the embodiments may be practiced without these specific details. Additionally, the Figures do not depict well-known features that may be needed to create a working vehicle so as not to obscure the embodiments in unnecessary detail.

What is claimed is:

1. A vehicle comprising:
   a first frame comprising a first axle having a first axis and a second axle having a second axis, the first axis not coaxial with the second axis;
   a first wheels rotatably connected to the first axle and defining a first inner volume;
   a second wheel rotatably connected to the second axle and defining a second inner volume;
   a first frame mount positioned within the first inner volume and connected to the first axle, the first frame mount further having a first portion extending below the first axis, which first portion supports a first propulsion unit drivingly coupled to the first wheel, a first energy source, and a first control unit;
   a second frame mount positioned within the second inner volume and connected to the second axle, the second frame mount further having a second portion extending below the second axis, which second portion supports a second propulsion unit drivingly coupled to the second wheel, a second energy source, and a second control unit;
   wherein a center of gravity of the vehicle is below the first and second axes.

2. The vehicle of claim 1, wherein a portion of the frame in between the first and second axles includes a pivot having a third axis parallel to the first and second axes.

3. The vehicle of claim 1, wherein each of the first and second propulsion units is at least one of a motor and an engine, each of the first and second energy sources is at least one of a battery and a fuel tank, and each of the first and second control units is at least one of an electronic speed control and a throttle.

4. The vehicle of claim 1, further comprising a receiver configured to receive signals from a transmitter and to send corresponding signals to at least one of the first and second control units.

5. The vehicle of claim 1, wherein the vehicle is configured to change direction by at least one of varying the speed of a propulsion unit and changing the length of a linear actuator.

6. The vehicle of claim 1, further comprising at least one of a waterproof material configured to prevent water from entering the inner volume of at least one of the plurality of wheels and features on the outer circumference of at least one of the plurality of wheels that enhance the propulsion of the vehicle on water.

7. The vehicle of claim 1, further comprising a seat located within the inner volume of at least one of the plurality of wheels and configured to support a person below the axle to which the wheel is connected.

8. A reconfigurable vehicle system comprising:
   a plurality of self-contained wheels each rotatably connected to a separate one of a plurality of axles, each wheel comprising:
   a substantially cylindrical inner volume;
   a mount connected to the separate one of the plurality of axles and positioned within the inner volume, each mount having a portion extending below the separate one of the plurality of axles that supports within the inner volume a propulsion unit drivingly coupled to the wheel, an energy source, and a control unit;
   wherein each of the plurality of axles is detachably engageable directly to a frame.

9. The reconfigurable vehicle system of claim 8, further comprising a semi-permeable membrane configured to prevent liquid from entering the inner volume.

10. The reconfigurable vehicle system of claim 8, wherein each mount further supports a receiver adapted to receive signals from a transmitter and to send corresponding signals to the control unit.

11. The reconfigurable vehicle system of claim 10, wherein each mount is selectively rotatable around the separate one of the plurality of axles to which it is connected upon receipt by the receiver of a command from the transmitter.

12. The vehicle system of claim 11, wherein the frame holds at least two wheels in linear alignment.

13. The vehicle system of claim 11, further comprising a seat suspended from at least one axle and adapted to support a person below the axle to which the seat is attached.

14. The reconfigurable vehicle system of claim 8, further comprising at least one of a frame adapted to maintain the plurality of self-contained wheels in substantial linear alignment and a frame adapted to maintain two of the plurality of self-contained in wheels in substantial axial alignment.

15. The reconfigurable vehicle system of claim 8, wherein a center of gravity of each self-contained wheel is lower than the separate one of the plurality of axles to which the self-contained wheel is connected.

16. The reconfigurable vehicle system of claim 8, wherein each mount is selectively rotatable around the separate one of the plurality of axles to which it is connected.

17. A vehicle system comprising:
   a frame comprising a plurality of structural members and at least one joint, each structural member connecting to one of a plurality of axles having parallel and offset axes, each one of the plurality of axles rotatably connected to one of a plurality of wheels; and suspended inside each one of the plurality of wheels, from the one of the plurality of axles to which the one of the plurality of wheels is connected, a propulsion device for driving the one of the plurality of wheels, energy source, and a control unit.

18. The vehicle system of claim 17, wherein the frame holds two of the plurality of wheels along a first axis and a third of the plurality of wheels along a second axis offset from and substantially parallel to the first axis.

19. The vehicle system of claim 18, wherein the first axis is offset from the second axis by less than the average outermost diameter of the wheels.

* * * * *

UNITED STATES PATENT AND TRADEMARK OFFICE
CERTIFICATE OF CORRECTION

PATENT NO.        : 9,457,647 B2
APPLICATION NO.   : 14/674764
DATED             : October 4, 2016
INVENTOR(S)       : Benjamin Meager Page 1 of 1

It is certified that error appears in the above-identified patent and that said Letters Patent is hereby corrected as shown below:

In the Claims

Claim 1, column 11, line 40: REPLACE "a first wheels" with "a first wheel"

Claim 17, column 13, line 4: REPLACE "energy source" with "an energy source"

Signed and Sealed this
Twentieth Day of December, 2016

Michelle K. Lee
*Director of the United States Patent and Trademark Office*